United States Patent
Takashima et al.

(10) Patent No.: US 10,597,076 B2
(45) Date of Patent: Mar. 24, 2020

(54) VEHICLE STEERING CONTROL DEVICE

(71) Applicants: Toru Takashima, Susono (JP); Takahiro Kojo, Gotenba (JP)

(72) Inventors: Toru Takashima, Susono (JP); Takahiro Kojo, Gotenba (JP)

(73) Assignee: TOYOTA JIDOSHA KABUSHIKI KAISHA, Toyota-shi, Aichi (JP)

( * ) Notice: Subject to any disclaimer, the term of this patent is extended or adjusted under 35 U.S.C. 154(b) by 422 days.

(21) Appl. No.: 14/780,091

(22) PCT Filed: Mar. 27, 2013

(86) PCT No.: PCT/JP2013/059018
§ 371 (c)(1),
(2) Date: Sep. 25, 2015

(87) PCT Pub. No.: WO2014/155564
PCT Pub. Date: Oct. 2, 2014

(65) Prior Publication Data
US 2016/0046321 A1    Feb. 18, 2016

(51) Int. Cl.
*B62D 6/00*     (2006.01)
*B62D 7/15*     (2006.01)

(52) U.S. Cl.
CPC .............. *B62D 7/159* (2013.01); *B62D 6/00* (2013.01); *B62D 6/002* (2013.01); *B62D 6/006* (2013.01)

(58) Field of Classification Search
CPC .......... B62D 7/159; B62D 6/006; B62D 6/00; B62D 6/002
USPC ........................................................... 701/41
See application file for complete search history.

(56) References Cited

U.S. PATENT DOCUMENTS 4,695,068 A * 9/1987 Kawamoto .......... B62D 7/1545
                                                              180/409
4,967,865 A    11/1990 Schindler
5,492,348 A * 2/1996 Shaw .................... B62D 7/1509
                                                              180/197

(Continued)

FOREIGN PATENT DOCUMENTS

DE       3804587 A1    8/1989
DE       60210726 T2   9/2006

(Continued)

OTHER PUBLICATIONS

Translation of JP02-27466.*

*Primary Examiner* — Charles A Fox
*Assistant Examiner* — Michael E Butler
(74) *Attorney, Agent, or Firm* — Sughrue Mion, PLLC

(57) ABSTRACT

Provided is a steering control device (10) for a vehicle (12), including a front wheel steering device (14) and a rear wheel steering device (42). When a magnitude of a steering angle (MA) is large in a state in which rear wheels are steered by the rear wheel steering device in the same phase with respect to front wheels, the steering control device carries out calculation so as to increase a rear wheel target correction steering angle $\Delta\delta bt$ for a correction steering for the rear wheels (18RL and 18RR) toward an opposite phase direction with respect to the front wheels (18FL and 18FR) compared with when the magnitude of the steering angle is small, and controls the rear wheel steering device based on the target correction steering angle $\Delta\delta bt$, thereby increasing a slip angle toward the inside of a turn of the vehicle.

9 Claims, 16 Drawing Sheets

(56) References Cited

U.S. PATENT DOCUMENTS

| | | | |
|---|---|---|---|
| 2001/0027892 A1* | 10/2001 | Masters | B62D 13/04 180/403 |
| 2002/0007239 A1* | 1/2002 | Matsumoto | B60K 23/0808 701/41 |
| 2003/0028303 A1* | 2/2003 | Sebastian | B62D 7/1509 701/41 |
| 2003/0078711 A1* | 4/2003 | Klein | B62D 7/159 701/41 |
| 2003/0105563 A1* | 6/2003 | Oshima | B60L 15/2036 701/22 |
| 2010/0228444 A1 | 9/2010 | Kojo et al. | |
| 2010/0332083 A1* | 12/2010 | Yanagi | B60G 7/006 701/42 |
| 2012/0303218 A1* | 11/2012 | Tamura | B62D 1/02 701/41 |

FOREIGN PATENT DOCUMENTS

| | | | |
|---|---|---|---|
| JP | 2274666 A | 11/1990 | |
| JP | 2008155889 A | 7/2008 | |
| JP | 4924378 B2 | 4/2012 | |

* cited by examiner

VEHICLE STEERING CONTROL DEVICE

CROSS REFERENCE TO RELATED APPLICATIONS

This application is a National Stage of International Application No. PCT/JP2013/059018 filed Mar. 27, 2013, the contents of which are incorporated herein by reference in their entirety.

TECHNICAL FIELD

The present invention relates to a vehicle steering control device, and more particularly, to a vehicle steering control device including a rear wheel steering device capable of steering rear wheels independently of a steering operation by a driver.

BACKGROUND ART

In a vehicle such as a motor vehicle including a rear wheel steering device, steering control is carried out so that rear wheels are steered by the rear wheel steering device depending on necessity, thereby increasing a turning performance of the vehicle compared with when the rear wheels are not steered. For example, as described in Patent Literature 1, rear wheels are steered toward an opposite phase direction with respect to front wheels in a low vehicle speed range, and are steered toward the same phase direction with respect to the front wheels in a high vehicle speed range. As a result of this control, a turning responsiveness of the vehicle is variably controlled depending on the vehicle speed.

With the steering control through the rear wheel steering, in the low vehicle speed range in which the steering angle changes across a relatively large range, the turning responsiveness of the vehicle can be increased so as to facilitate pulling over and garaging of the vehicle. Moreover, in the high vehicle speed range in which the change range of the steering angle is small, the turning responsiveness of the vehicle can be decreased so as to increase an operation stability of the vehicle.

CITATION LIST

Patent Literature

[PTL 1] JP 4924378 B2
[PTL 2] JP 2008-155889 A

SUMMARY OF INVENTION

Technical Problem

In general, a slip angle of the vehicle is preferably 0 or a small value in order to secure an appropriate operation stability of the vehicle when the vehicle travels at a medium or high speed. However, even under a situation in which the vehicle travels at the medium or high speed, when the magnitude of the steering angle is relatively large, the slip angle of the vehicle toward the inside of a turn is small compared with a magnitude of the steering angle. Thus, an occupant of the vehicle feels that a turning ability of the vehicle decreases and the vehicle is directing toward the outside of a turn. In other words, an appropriate value for the slip angle of the vehicle felt by the occupant of the vehicle differs depending on the vehicle speed as well as depending on the magnitude of the steering angle particularly when the vehicle is traveling at the medium or high speed.

However, some steering control through the rear wheel steering, which is carried out in order to control the turning responsiveness depending on the vehicle speed, cannot control the slip angle to be an appropriate value for the sense of the occupant of the vehicle when the vehicle travels at the medium or high speed independently of the magnitude of the steering angle. In other words, when the steering amount of the rear wheel toward the same phase direction with respect to the front wheels is decreased in order to decrease the possibility that the occupant of the vehicle feels the decrease of the turning ability of the vehicle when the vehicle travels at the medium or high speed, the decrease in the turning responsiveness of the vehicle is insufficient, and the operation stability of the vehicle cannot be effectively increased. Conversely, when the steering amount of the rear wheels in the same phase direction with respect to the front wheels is increased in order to effectively increase the steering stability of the vehicle when the vehicle travels at the medium or high speed, the slip angle of the vehicle decreases, and hence the possibility that the occupant of the vehicle feels the decrease of the turning ability of the vehicle cannot be effectively decreased.

It should be noted that in Patent Literature 2, there is described a steering control device for increasing an equivalent cornering power of rear wheels when a ratio of a slip angle to a lateral acceleration is determined to be large based on a ratio between the lateral acceleration and a steering angle of a vehicle and a ratio between the slip angle and the lateral acceleration of the vehicle. However, even this steering control device cannot solve the above-mentioned problem.

The present invention has been made in view of the above-mentioned problem in the related-art steering control devices for a vehicle including the rear wheel steering device. Thus, a main object of the present invention is to provide a steering control device improved so as to be able to control a slip angle of a vehicle to be an appropriate value for the sense of an occupant of the vehicle when the vehicle travels at a medium or high speed independently of the magnitude of a steering angle.

Solution to Problem and Advantageous Effects of Invention

According to one embodiment of the present invention, the above-mentioned main object is achieved by a vehicle steering control device, including: a front wheel steering device configured to steer a front wheel in response to a steering operation by a driver; and a rear wheel steering device capable of steering a rear wheel independently of the steering operation by the driver, in which, when correction steering is steering of the rear wheel toward an opposite phase direction with respect to the front wheel, and when a magnitude of a steering angle representing a steering operation amount by the driver is large in a state in which the rear wheel is steered in the same phase with respect to the front wheel by the rear wheel steering device, the vehicle steering control device controls the rear wheel steering device so that a magnitude of a correction steering amount is large compared with when the magnitude of the steering angle is small.

With the above-mentioned configuration, when the magnitude of the steering angle is large in the state in which the rear wheels are steered in the same phase with respect to the front wheels, the rear wheel steering device is controlled so that the magnitude of the correction steering amount is large compared with when the magnitude of the steering angle is small. Thus, when the magnitude of the steering angle is large in the state in which the rear wheels are steered in the same phase with respect to the front wheels, the steering amount in the same phase of the rear wheels can be decreased, to thereby decrease the decrease amount of the turning responsiveness of the vehicle. Thus, the slip angle of the vehicle toward the inside of a turn can be increased, and hence the possibility that the occupant of the vehicle feels the decrease in the turning ability of the vehicle can be effectively decreased.

It should be noted that, even in the state in which the rear wheels are steered in the same phase with respect to the front wheels, the magnitude of the correction steering amount does not increase when the magnitude of the steering angle is not large, and hence the steering amount in the same phase of the rear wheels is not greatly decreased. Thus, the turning responsiveness of the vehicle is not unnecessarily increased, and hence an appropriate operation stability of the vehicle can be secured.

Further, according to one embodiment of the present invention, in the above-mentioned configuration, when the magnitude of the steering angle is large, a ratio of the magnitude of the correction steering amount to the magnitude of the steering angle may be large compared with when the magnitude of the steering angle is small.

With the above-mentioned configuration, without an excessive increase in the magnitude of the correction steering amount in the state in which the magnitude of the steering angle is small, the magnitude of the correction steering amount in the state in which the magnitude of the steering angle is large can be increased. Thus, without an excessive increase in the slip angle of the vehicle when the magnitude of the vehicle steering angle is small, the slip angle of the vehicle in the state in which the magnitude of the steering angle is large can be increased, to thereby effectively decrease the possibility that the occupant of the vehicle feels the decrease in the turning ability of the vehicle.

Further, according to one embodiment of the present invention, in the above-mentioned configuration, the magnitude of the correction steering amount may be large when a vehicle speed is high compared with when the vehicle speed is low.

Even for the same magnitude of the steering angle, that is, even for the same turn radius of the vehicle, as the vehicle speed increases, a turn lateral acceleration of the vehicle increases, and the occupant of the vehicle is more liable to feel the decrease in the turning ability of the vehicle. Thus, the magnitude of the correction steering amount is preferably variably set so as to be large when the vehicle speed is high compared with when the vehicle speed is low.

With the above-mentioned configuration, without the excessive increase in the magnitude of the correction steering amount in the state in which the vehicle speed is low, the magnitude of the correction steering amount in the state in which the vehicle speed is high can be increased. Thus, without an excessive increase in the slip angle of the vehicle when the vehicle speed is low is small, the slip angle of the vehicle when the vehicle speed is high can be increased, to thereby effectively decrease the possibility that the occupant of the vehicle feels the decrease in the turning ability of the vehicle.

Further, according to one embodiment of the present invention, in the above-mentioned configuration, the magnitude of the correction steering amount maybe small when a friction coefficient of a road surface is small compared with when the friction coefficient of the road surface is large.

When the friction coefficient of the road surface is small, the vehicle is liable to enter an understeer state or an oversteer state. In the state in which the vehicle is in the oversteer state, when the correction steering large in the correction steering amount is applied to the rear wheels, the steering angle of the rear wheels changes toward the opposite phase direction with respect to the front wheels, and the cornering forces on the rear wheels decrease. Thus, the oversteer state of the vehicle deteriorates.

With the above-mentioned configuration, the magnitude of the correction steering amount can be decreased when the friction coefficient of the road surface is small compared with when the friction coefficient of the road surface is large. Thus, when the friction coefficient of the road surface is small, it is possible to decrease such a possibility that, as a result of the correction steering, the vehicle enters the oversteer state, or the oversteer state of the vehicle deteriorates. Moreover, when the road surface friction coefficient is large, the magnitude of the correction steering amount is not unnecessarily decreased, and hence the possibility that the occupant of the vehicle feels the deterioration of the turning ability of the vehicle can be effectively decreased.

Further, according to one embodiment of the present invention, in the above-mentioned configuration, when the magnitude of the steering angle is equal to or less than a lower limit reference value, the correction steering may be inhibited from being carried out.

The steering angle is detected by a detection device such as a steering angle sensor as a value that is 0 as a value corresponding to a straight travel position of the vehicle, is positive as a value corresponding to one of left and right turn directions, and is negative as a value corresponding to the other turn direction. However, there is such a case that the steering angle 0 of does not correspond to the actual straight travel position of the vehicle. In particular, when a steering angle change device for changing a relationship of a steering input device such as a steering wheel with the steering angle of the front wheels is used, so-called a neutral displacement in which the steering angle 0 of does not correspond to the actual straight travel position of the vehicle may occur.

In the case where the correction steering is carried out when the magnitude of the steering angle is not 0, and the neutral displacement occurs, there occurs a situation in which while the correction steering amount rapidly increases in steering toward one turn direction, the correction steering amount does not increase in steering toward the other turn direction. When this situation occurs, a turn characteristic of the vehicle varies depending on the steering direction, and hence such a state that the driver feels a sense of discomfort cannot be avoided.

With the above-mentioned configuration, the correction steering is not carried out when the magnitude of the steering angle is equal to or less than the lower limit reference value, and hence even when the neutral displacement occurs, the possibility that the turn characteristic of the vehicle varies depending on the steering direction when the steering is carried out from the position at which the steering angle is 0 can be decreased. Thus, even when the neutral displacement occurs, the possibility that the driver feels the sense of discomfort caused by the correction steering can be decreased.

Further, according to one embodiment of the present invention, in the above-mentioned configuration, the lower limit reference value may be small when a vehicle speed is high compared with when the vehicle speed is low.

As described above, the turn lateral acceleration of the vehicle increases as the vehicle speed increases, and the occupant of the vehicle is more liable to feel the decrease in the turning ability of the vehicle. Thus, when the vehicle speed is high, compared with when the vehicle speed is low, the correction steering is preferably carried out even when the magnitude of the steering angle is small.

With the above-mentioned configuration, the lower limit reference value can be decreased when the vehicle speed is high compared with when the vehicle speed is low. Thus, when the vehicle speed is high compared with when the vehicle speed is low, the correction steering can be carried out even when the magnitude of the steering angle is small. As a result, the possibility that the occupant of the vehicle feels the decrease in the turning ability of the vehicle can be effectively decreased.

Further, according to one embodiment of the present invention, in the above-mentioned configuration, the vehicle may have at least two travel modes including a travel mode of a normal turning responsiveness and a travel mode of a high turning responsiveness, and the lower limit reference value may be small when the travel mode is the travel mode of the high turning responsiveness compared with when the travel mode is the travel mode of the normal turning responsiveness.

When the magnitude of the steering angle exceeds the constant lower limit reference value independently of the turning responsiveness of the vehicle, and the correction steering is carried out, the turn lateral acceleration of the vehicle when the correction steering starts varies depending on the degree of the turning responsiveness of the vehicle. Therefore, when the vehicle includes at least two travel modes including the travel mode of the normal turning responsiveness and the travel mode of the high turning responsiveness, the state in which the turn lateral acceleration of the vehicle when the correction steering starts varies depending on the travel mode cannot be avoided.

With the above-mentioned configuration, when the travel mode is the travel mode of the high turning responsiveness, the lower limit reference value can be decreased compared with when the travel mode is the travel mode of the normal turning responsiveness. Thus, a degree of the variation depending on the travel mode in the turn lateral acceleration of the vehicle when the correction steering starts can be decreased. As a result, the sense of discomfort caused by the variation depending on the travel mode in the turn lateral acceleration of the vehicle when the correction steering starts can be decreased.

Further, according to one embodiment of the present invention, in the above-mentioned configuration, when the magnitude of the steering angle is equal to or more than an upper limit reference value, the magnitude of the correction steering amount may be inhibited from being increased even when the magnitude of the steering angle increases.

When the magnitude of the steering angle increases, and the magnitude of the correction steering amount thus increases, an amount of the change in the steering angle of the rear wheels toward the opposite phase direction with respect to the front wheels increases. As a result, the cornering forces on the rear wheels decrease, and the turn yaw moment acting on the vehicle increases, and hence the vehicle is liable to enter the oversteer state. Thus, an upper limit is preferably set for the increase in the magnitude of the correction steering amount due to the increase in the magnitude of the steering angle.

With the above-mentioned configuration, when the magnitude of the steering angle is equal to or more than the upper limit reference value, the magnitude of the correction steering amount can be prevented from increasing even when the magnitude of the steering angle increases. Thus, even when the magnitude of the steering angle is equal to or more than the upper limit reference value, the magnitude of the correction steering amount can be prevented from excessively increasing. As a result, the possibility that the cornering forces on the rear wheels decrease and the vehicle thus enters the oversteer state can be effectively decreased.

Further, according to one embodiment of the present invention, in the above-mentioned configuration, the upper limit reference value may be small when a vehicle speed is high compared with when the vehicle speed is low.

With the above-mentioned configuration, the upper limit reference value can be decreased when the vehicle speed is high compared with when the vehicle speed is low. Thus, when the vehicle speed is high, and the possibility that the travel stability of the vehicle is decreased by the decrease in the cornering forces on the rear wheels is high, compared with when the fear is low, on a stage on which the magnitude of the steering angle is small, the magnitude of the correction steering amount can be prevented from increasing. Thus, when the vehicle speed is high, compared with when the vehicle speed is low, the possibility that the travel stability of the vehicle is decreased by the decrease in the cornering forces on the rear wheels can be effectively decreased.

Further, according to one embodiment of the present invention, in the above-mentioned configuration, the vehicle may have at least two travel modes including a travel mode of a normal turning responsiveness and a travel mode of a high turning responsiveness, and the upper limit reference value may be small when the travel mode is the travel mode of the high turning responsiveness compared with when the travel mode is the travel mode of the normal turning responsiveness.

In order to effectively decrease the possibility that the travel stability of the vehicle is decreased by the decrease in the cornering forces on the rear wheels, when the turning responsiveness of the vehicle is high, the cornering forces on the rear wheels are preferably early prevented from decreasing compared with when the turning responsiveness of the vehicle is low.

With the above-mentioned configuration, when the travel mode is the travel mode of the high turning responsiveness, the upper limit reference value can be decreased compared with when the travel mode is the travel mode of the normal turning responsiveness. Thus, when the travel mode is the travel mode of the high turning responsiveness, the prevention of the decrease in the cornering forces on the rear wheels can be started early compared with when the travel mode is the normal turning responsiveness.

Further, according to one embodiment of the present invention, in the above-mentioned configuration: the vehicle includes at least two travel modes including a travel mode of a normal turning responsiveness and a travel mode of a high turning responsiveness; and a ratio of the magnitude of the correction steering amount to the magnitude of the steering angle may be large when the travel mode is the travel mode of the high turning responsiveness compared with when the travel mode is the travel mode of the normal turning responsiveness, and a period of a transition of the travel mode between the at least two travel modes may be long when the magnitude of the steering angle is large compared with when the magnitude of the steering angle is small.

In the travel mode of the high turning responsiveness, compared with the travel mode of the normal turning responsiveness, when the ratio of the magnitude of the correction steering amount to the magnitude of the steering angle is high, the magnitude of the correction steering amount in the travel mode of the high turning responsiveness is also larger than the value in the travel mode of the normal turning responsiveness. Thus, a difference in the magnitude of the correction steering amount between the two travel modes increases when the magnitude of the steering angle is large compared with when the magnitude of the steering angle is small. Thus, in order to prevent a rapid change in the magnitude of the correction steering amount during the transition of the travel mode between the two travel modes, when the magnitude of the steering angle is large, the transition is preferably slowly carried out compared with when the magnitude of the steering angle is small.

With the above-mentioned configuration, when the magnitude of the steering angle is large, the period of the transition of the travel mode between the two travel modes can be increased compared with when the magnitude of the steering angle is small. Thus, even when the magnitude of the steering angle is large, a change in the magnitude of the correction steering amount during the transition of the travel mode between the two travel modes can be gentle. As a result, an undesirable change in a behavior of the vehicle caused by the rapid change in the magnitude of the correction steering amount can be prevented.

According to one preferred mode of the present invention, the rear wheel steering device may be controlled so that the rear wheels are steered in an opposite phase with respect to the front wheels in a low vehicle speed range, and the rear wheels are steered in the same phase with respect to the front wheels in a high vehicle speed range.

According to another preferred mode of the present invention, a steady-state gain and a derivative gain of steering control for the rear wheels by the rear wheel steering device may be high when the vehicle speed is high compared with when the vehicle speed is low.

According to still another preferred mode of the present invention, the vehicle may include a steering angle varying device for changing the steering angle of the front wheels with respect to the steering input device, and the steering control device may control the steering angle varying device so that steering for the front wheels is accelerated in the low vehicle speed range, and the steering for the front wheels is decelerated in the high vehicle speed range.

According to yet still another preferred mode of the present invention, a steady-state gain and a derivative gain of steering control for the front wheels by the steering angle varying device may be high when the vehicle speed is high compared with when the vehicle speed is low.

DESCRIPTION OF EMBODIMENTS

A detailed description is now given of some preferred embodiments of the present invention referring to the accompanying drawings.

First Embodiment

Figure 1:
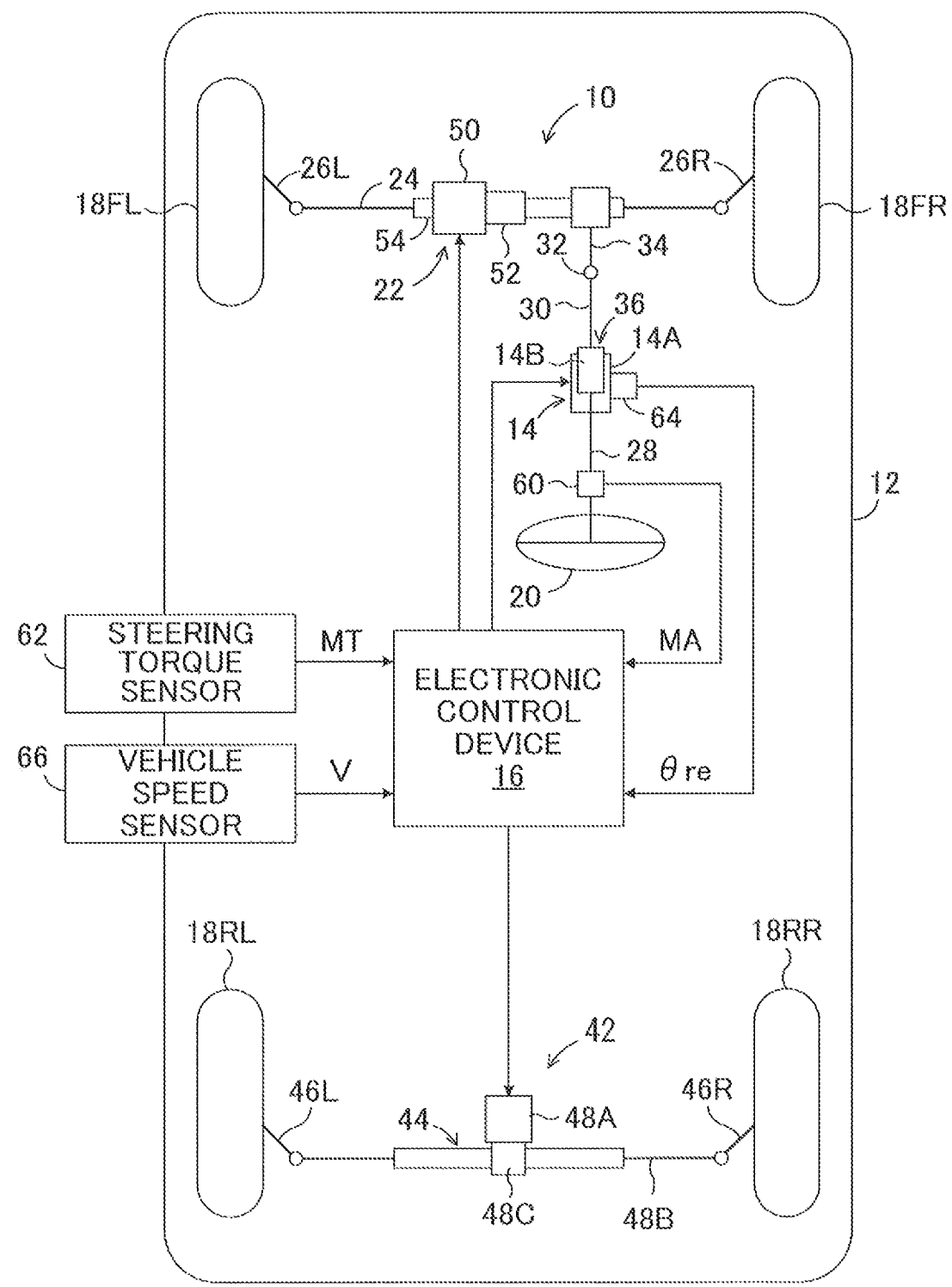
FIG. 1 is a schematic configuration diagram for illustrating a vehicle steering control device according to a first embodiment of the present invention applied to a vehicle on which a steering angle varying device for front wheels and a rear wheel steering device are installed.

FIG. 1 is a schematic configuration diagram for illustrating a vehicle steering control device according to a first embodiment of the present invention applied to a vehicle on which a steering angle varying device for front wheels and a rear wheel steering device are installed.

In FIG. 1, reference numeral 10 denotes the steering control device installed on a vehicle 12, and the steering control device 10 includes a steering angle varying device 14 for the front wheels, a rear wheel steering device 42, and an electronic control device 16 for controlling those devices. Moreover, in FIG. 1, reference numerals 18FL and 18FR respectively denote front left and right wheels of the vehicle 12, and reference numerals 18RL and 18RR respectively denote rear left and right wheels. The front left and right wheels 18FL and 18FR, which are steered wheels, are turned via a rack bar 24 and tie rods 26L and 26R by an electric power steering device 22 of a rack-and-pinion type driven in response to an operation by a driver on a steering wheel 20.

The steering wheel 20, which is a steering input device, is connected for drive to a pinion shaft 34 of the power steering device 22 via an upper steering shaft 28, the steering angle varying device 14, a lower steering shaft 30, and a universal joint 32. The steering angle varying device 14 includes a motor 36 for supplementary turning drive coupled to a lower end of the upper steering shaft 28 on a housing 14A side, and coupled to an upper end of the lower steering shaft 30 via a speed reduction mechanism (not shown) on a rotator 14B side.

Thus, the steering angle varying device 14 rotationally drives the lower steering shaft 30 relatively to the upper steering shaft 28, thereby driving, for supplementary turning, the front left and right wheels 18FL and 18FR relatively to the steering wheel 20. As a result, the steering angle varying device 14 functions as a variable gear ratio steering (VGRS) device for increasing/decreasing a steering gear ratio (reciprocal of steering transmission ratio). Moreover, the steering angle varying device 14 also functions as a front wheel steering angle varying device for changing the steering angle of the front left and right wheels independently of absence/presence of the steering operation by the driver, to thereby change a relationship between a rotational position of the steering wheel 20 and the steering angle of the front wheels. As described in detail later, the steering angle varying device 14 is controlled by a steering angle control unit of the electronic control device 16.

The rear wheel steering device 42 includes an electric power steering device 44, and the power steering device 44 steers the rear left and right wheels 18RL and 18RR via tie rods 46L and 46R independently of the steering of the front left and right wheels 18FL and 18FR. Thus, the rear wheel steering device 42 functions as a rear wheel steering angle varying device for changing the steering angle of the rear left and right wheels independently of the steering operation by the driver, and, as described later, is controlled by the steering angle control unit of the electronic control device 16.

The illustrated rear wheel steering device 42 is an electric supplementary steering device having a widely-known configuration, and includes a motor 48A, and a motion conversion mechanism 48C of, for example, a screw type, for converting a rotation of the motor 48A into a reciprocating motion of a relay rod 48B. The relay rod 48B cooperates with the tie rods 46L and 46R and a knuckle arm (not shown) to construct a turning mechanism for driving the rear left and right wheels 18RL and 18RR to turn through the reciprocating motion of the relay rod 48B.

Although not shown in the figure, the motion conversion mechanism 48C converts the rotation of the motor 48A into the reciprocating motion of the relay rod 48B, but does not transmit, to the motor 48A, forces received by the rear left and right wheels 18RL and 18RR from a road surface and then transmitted to the relay rod 48B. Thus, the rear wheel steering device 42 is configured to prevent the motor 48A from being rotationally driven by the forces transmitted from the road surface to the relay rod 48B.

In the illustrated embodiment, the electric power steering device 22 is an electric power steering device of a rack coaxial type, and includes a motor 50 and a conversion mechanism 52 of, for example, a ball screw type for converting a rotational torque of the motor 50 into a force in the reciprocating direction of the rack bar 24. The power steering device 22 is controlled by an electric power steering device (EPS) control unit of the electronic control device 16. The electric power steering device 22 functions as a supplementary steering force generation device for generating a supplementary steering force for relatively driving the rack bar 24 with respect to the housing 54, to thereby decrease a steering load on the driver and assist the driver in an operation of the steering angle varying device 14.

It should be noted that the steering angle varying device 14 and the rear wheel steering device 42 may have arbitrary configurations as long as the steering angle varying device 14 and the rear wheel steering device 42 can respectively change the steering angles of the front wheels and the rear wheels as necessary independently of the steering operation by the driver. Further, the supplementary steering force generation device may have an arbitrary configuration as long as the supplementary steering force generation device can generate the supplementary steering force. Moreover, the steering input device is the steering wheel 20, but the steering input device may also be a steering lever of a joystick type.

In the illustrated embodiment, a steering angle sensor 60 for detecting the rotational angle of the upper steering shaft 28 as a steering angle MA is provided on the upper steering shaft 28. A steering torque sensor 62 for detecting a steering torque MT is provided on a pinion shaft 34. On the steering angle varying device 14, a rotational angle sensor 64 for detecting a relative rotational angle θre thereof, namely, a relative rotational angle of the lower steering shaft 30 with respect to the upper steering shaft 28 is provided.

A signal representing the steering angle MA, a signal representing the steering torque MT, and a signal representing the relative rotational angle θre are input along with a signal representing a vehicle speed V detected by a vehicle speed sensor 66 to the steering angle control unit and the EPS control unit of the electronic control device 16. It should be noted that the rotational angle of the lower steering shaft 30 is detected, and the relative rotational angle θre may be acquired as a difference in the rotational angle between the steering angle θ and the lower steering shaft 30.

Each of the control units of the electronic control device 16 may include a microcomputer including a CPU, a ROM, a RAM, and an input/output port device connected to one another via a bidirectional common bus. Moreover, the steering angle sensor 60, the steering torque sensor 62, and the rotational angle sensor 64 respectively detect the steering angle MA, the steering torque MT, and the relative rotational angle θre while the steering or turning in the right turn direction of the vehicle is considered as positive.

As described in later, the electronic control device 16 controls the steering angle varying device 14 and the rear wheel steering device 42 in accordance with flowcharts illustrated in FIG. 2 to FIG. 5, to thereby carry out steering control for controlling steering angles of the front and rear wheels. As a result, the electronic control device 16 controls the steering angles of the front and rear wheels so as to satisfy a direction operation request from the driver, and corrects the steering angle of the rear wheels depending on necessity so as to improve a turning ability of the vehicle during a turn.

In particular, the electronic control device 16 calculates a front wheel target steering angle δft and a rear wheel basic target steering angle δrbt based on the steering angle MA and the vehicle speed V, and calculates a rear wheel target correction steering angle Δδrbt for improving the turning ability of the vehicle. Then, the electronic control device 16 controls the steering angle of the front wheels based on the target steering angle δft, and controls the steering angle of the rear wheels based on a target steering angle δrt, which is a sum of the basic target steering angle δrbt and the target correction steering angle Δδrbt.

Further the electronic control device 16 controls the electric power steering device 22 based on the steering torque MT and the like to decrease a steering load imposed on the driver, and assist the steering varying device 14 in controlling the steering angle of the front left and right wheels so as to attain the target steering angle δft.

Figure 2:
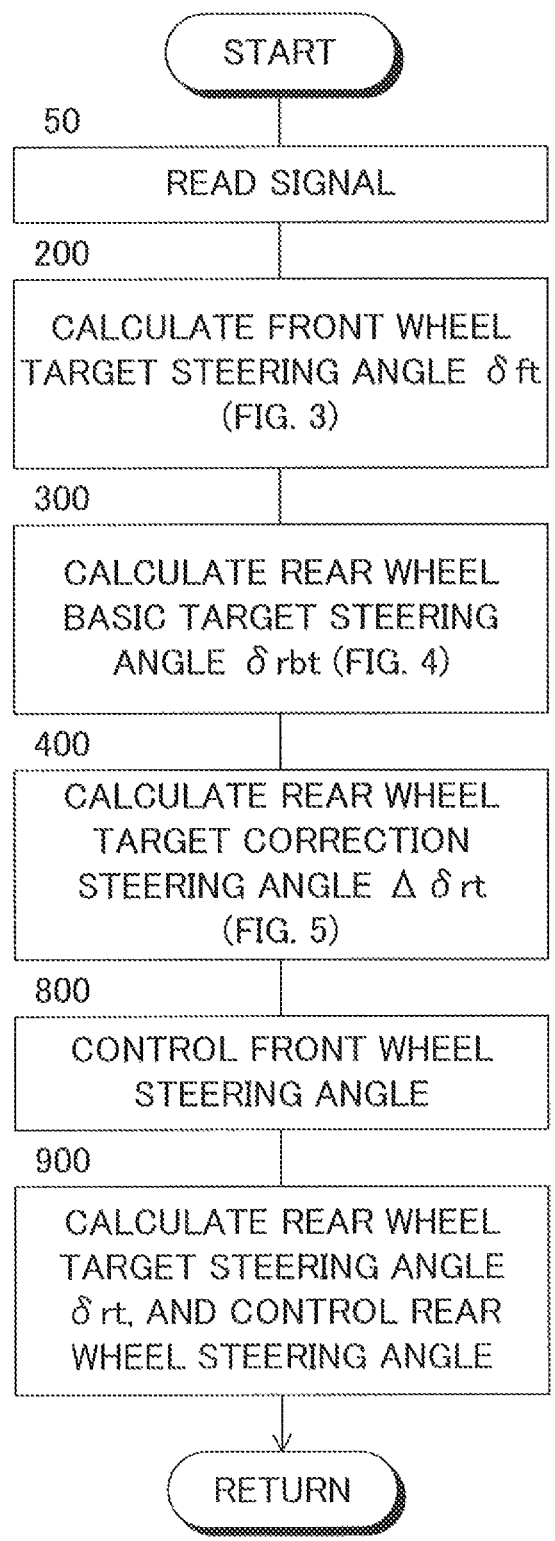
FIG. 2 is a flowchart for illustrating a main routine for steering control according to the first embodiment.

<Main Routine for Steering Control> (FIG. 2)

Referring to a flowchart illustrated in FIG. 2, a description is now given of a main routine for the steering control in the first embodiment. It should be noted that the control based on the flowchart illustrated in FIG. 2 is started by switching an ignition switch (not shown), from off to on, and is repeated at predetermined periods.

First, in Step 50, the signal representing the steering angle MA detected by the steering angle sensor 64 and the like are read.

Figure 3:
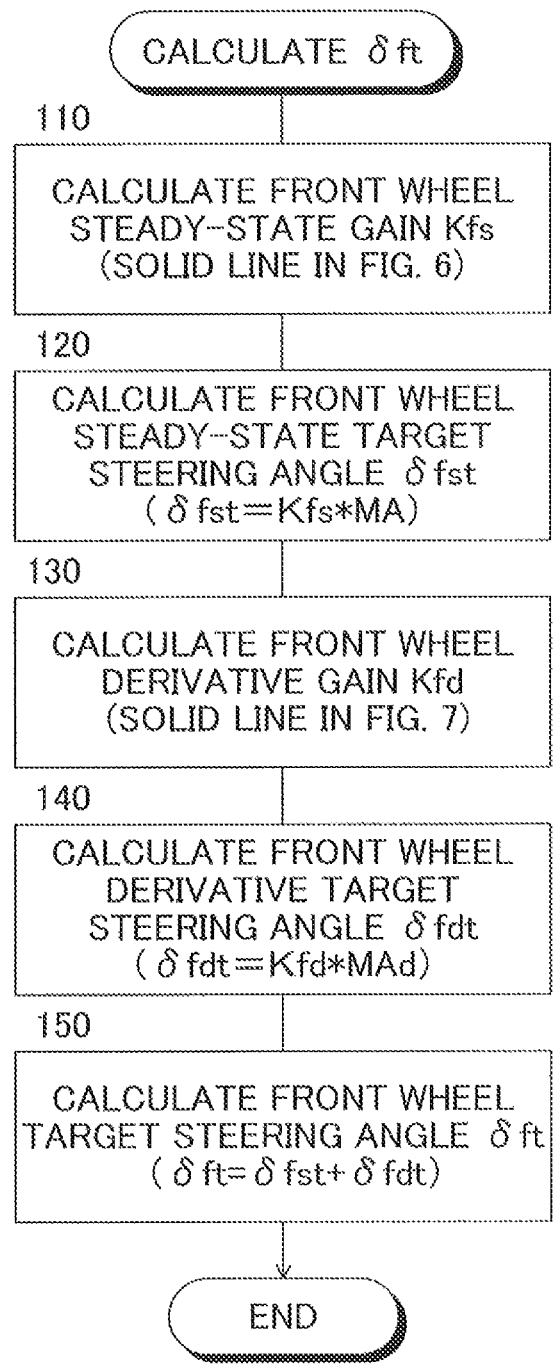
FIG. 3 is a flowchart for illustrating a front wheel target steering angle $\delta$ft calculation routine executed in Step 200 of FIG. 2.

In Step 200, in accordance with a flowchart illustrated in FIG. 3, the front wheel target steering angle δft is calculated based on the steering angle MA and the vehicle speed V.

Figure 4:
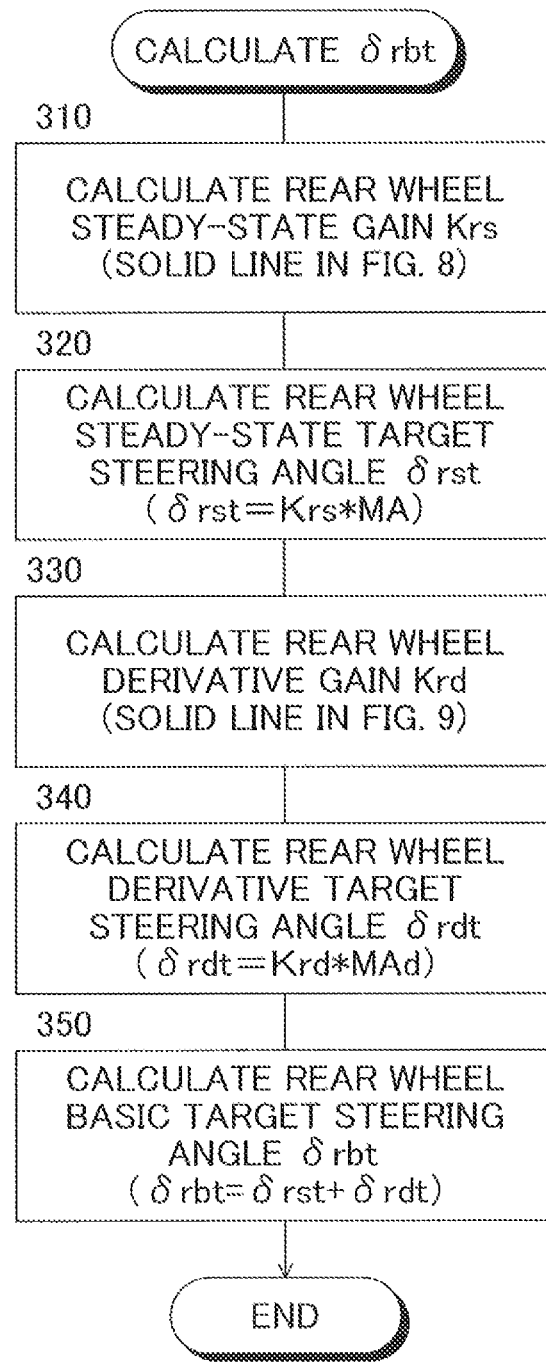
FIG. 4 is a flowchart for illustrating a rear wheel basic target steering angle $\delta$rbt calculation routine executed in Step 300 of FIG. 2.

In Step 300, in accordance with a flowchart illustrated in FIG. 4, the rear wheel basic target steering angle δrbt is calculated based on the steering angle MA and the vehicle speed V.

Figure 5:
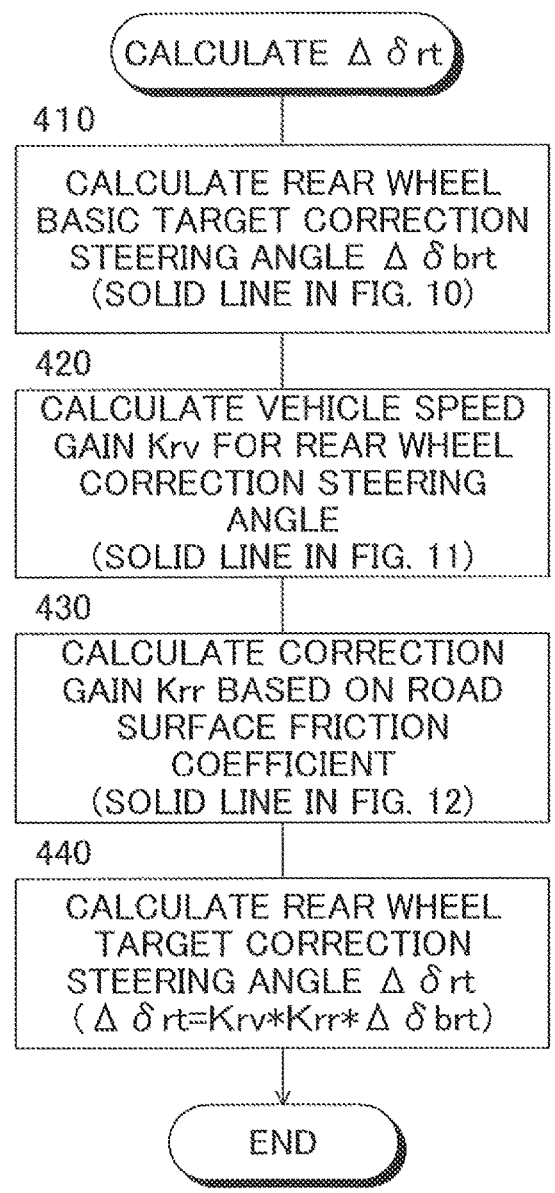
FIG. 5 is a flowchart for illustrating a rear wheel target correction steering angle $\Delta\delta$rbt calculation routine executed in Step 400 of FIG. 2.

In Step 400, in accordance with a flowchart illustrated in FIG. 5, the rear wheel target correction steering angle Δδrbt for improving the turning ability of the vehicle is calculated based on the steering angle MA and the vehicle speed V.

In Step 800, the steering angle varying device 14 is controlled so that the steering angle of the front wheels reaches the target steering angle δft.

In Step 900, the sum of the basic target steering angle δrbt and the target correction steering angle Δδrbt is calculated as the rear wheel target steering angle δrt, and the rear wheel steering device 42 is controlled so that the steering angle of the rear wheels reaches the target steering angle δrt.

<Front Wheel Target Steering Angle δft Calculation Routine> (FIG. 3)

Figure 6:
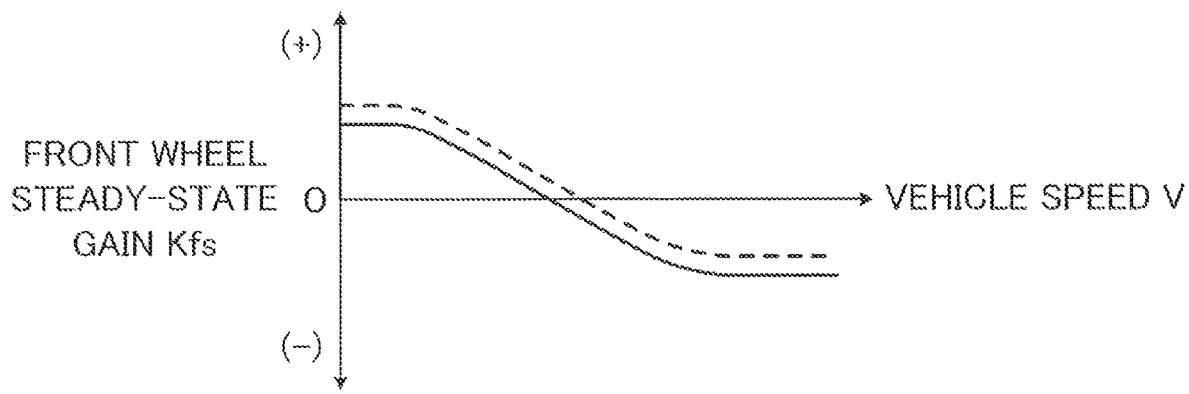
FIG. 6 is a map for calculating a front wheel steady-state gain Kfs based on a vehicle speed V.

In Step 110 of the front wheel target steering angle δft calculation routine, a steady-state gain Kfs for the front wheels is calculated from the map represented by the solid line of FIG. 6 based on the vehicle speed V. In this case, the steady-state gain Kfs is calculated so as to take a positive value (speed increase gain) in a low vehicle speed range, and a negative value (speed decrease gain) in a medium and high vehicle speed range. Moreover, the steady-state gain Kfs is calculated so as to increase as the vehicle speed V decreases in the low vehicle speed range, and to increase in the absolute value as the vehicle speed V increases in the medium or high vehicle speed range.

In Step 120, the front wheel steady-state target steering angle δfst is calculated as a product Kfs*MA of the steady-state gain Kfs calculated in Step 110 and the steering angle MA.

Figure 7:
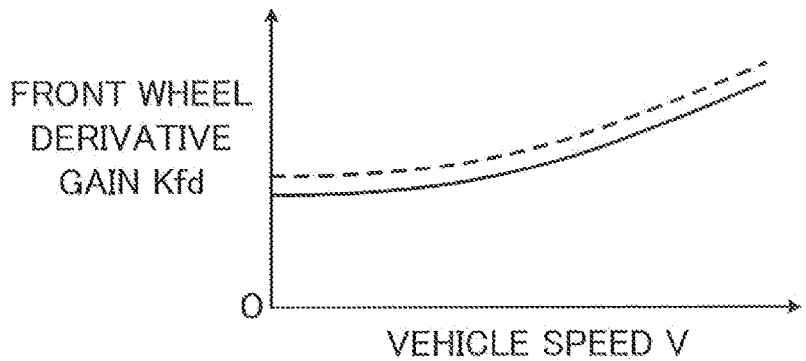
FIG. 7 is a map for calculating a front wheel derivative gain Kfd based on the vehicle speed V.

In Step 130, a derivative gain Kfd for the front wheels is calculated based on the vehicle speed V from the map represented by the solid line of FIG. 7. In this case, the derivative gain Kfd is calculated so as to increase as the vehicle speed V increases, and so that an increase rate of the derivative gain associated with an increase in the vehicle speed increase as the vehicle speed V increases.

In Step 140, for example, a steering angular velocity MAd is calculated as a derivative with respect to time of the steering angle MA, and a front wheel derivative target steering angle δfdt is calculated as a product of the derivative gain Kfd calculated in Step 130 and the steering angular velocity MAd.

In Step 150, the front wheel target steering angle δft is calculated as a sum δfst+δfdt of the steady-state target steering angle δfst calculated in Step 120 and the derivative target steering angle δfdt calculated in Step 140.

<Rear Wheel Basic Target Steering Angle δrbt Calculation Routine> (FIG. 4)

Figure 8:
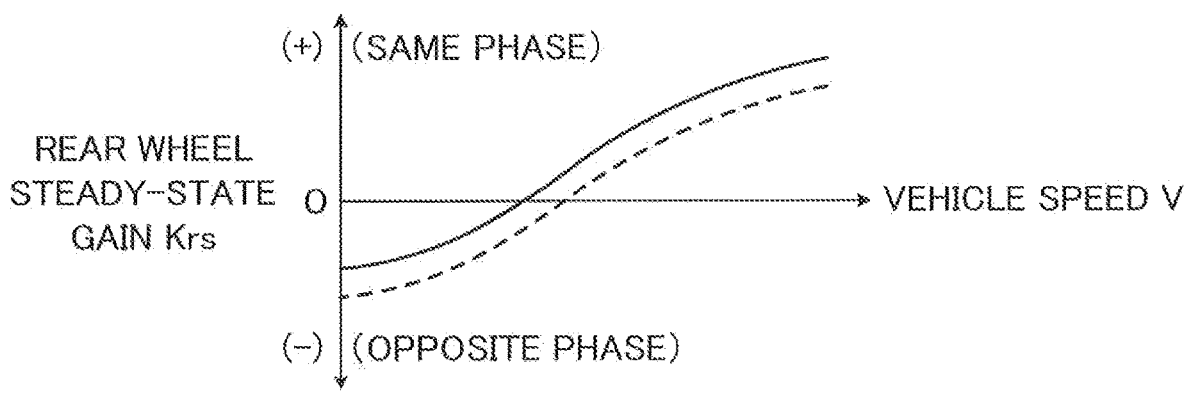
FIG. 8 is a map for calculating a rear wheel steady-state gain Krs based on the vehicle speed V.

In Step 310 of the rear wheel basic target steering angle δrbt calculation routine, a steady-state gain Krs for the rear wheels is calculated from the map represented by the solid line of FIG. 8 based on the vehicle speed V. In this case, the steady-state gain Krs is calculated so as to take a negative value, namely, again in the opposite phase with respect to the front wheels in the same phase with respect to the front wheels in the low vehicle speed range, and a positive value (speed decrease gain) in the medium and high vehicle speed range. Moreover, the steady-state gain Krs is calculated so as to increase as the vehicle speed V decreases in the low vehicle speed range, and to increase as the vehicle speed V increases in the medium or high vehicle speed range. It should be noted that the steady-state gain Krs may be 0 in the medium vehicle speed range.

In Step 320, the rear wheel steady-state target steering angle δrst is calculated as a product Krs*MA of the steady-state gain Krs calculated in Step 310 and the steering angle MA.

Figure 9:
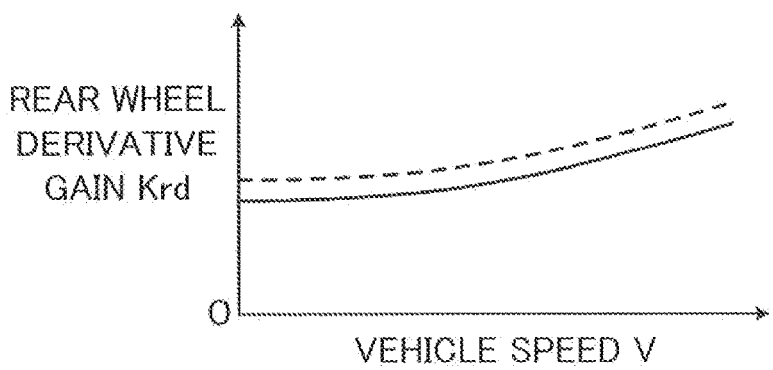
FIG. 9 is a map for calculating a rear wheel derivative gain Krd based on the vehicle speed V.

In Step 330, a derivative gain Krd for the rear wheels is calculated based on the vehicle speed V from the map represented by the solid line of FIG. 9. In this case, the derivative gain Krd is calculated so as to increase as the vehicle speed V increases, and so that an increase rate of the derivative gain associated with an increase in the vehicle speed increase as the vehicle speed V increases.

In Step 340, for example, the steering angular velocity MAd is calculated as the derivative with respect to time of the steering angle MA, and a rear wheel target steering angle δrdt is calculated as a product of the derivative gain Krd calculated in Step 330 and the steering angular velocity MAd.

In Step 350, the rear wheel basic target steering angle δrbt is calculated as a sum δrst+δrdt of the steady-state target steering angle δrst calculated in Step 320 and the derivative target steering angle δrdt calculated in Step 340.

It should be noted that the calculations of the front wheel target steering angle δft and the rear wheel basic target steering angle δrbt do not constitute a gist of the present invention. Thus, as long as the rear wheel steady-state target steering angle δrst is calculated as a steering angle in the same phase with respect to the front wheels at least in the high vehicle speed range, the front wheel target steering angle δft and the rear wheel basic target steering angle δrbt may be calculated in an arbitrary manner. Moreover, in this case, the rear wheel steady-state target steering angle δrst is preferably calculated so as to be a steering angle in the opposite phase with respect to the front wheels in the low vehicle speed range.

<Rear Wheel Target Correction Steering Angle Δδrbt Calculation Routine> (FIG. 5)

Figure 10:
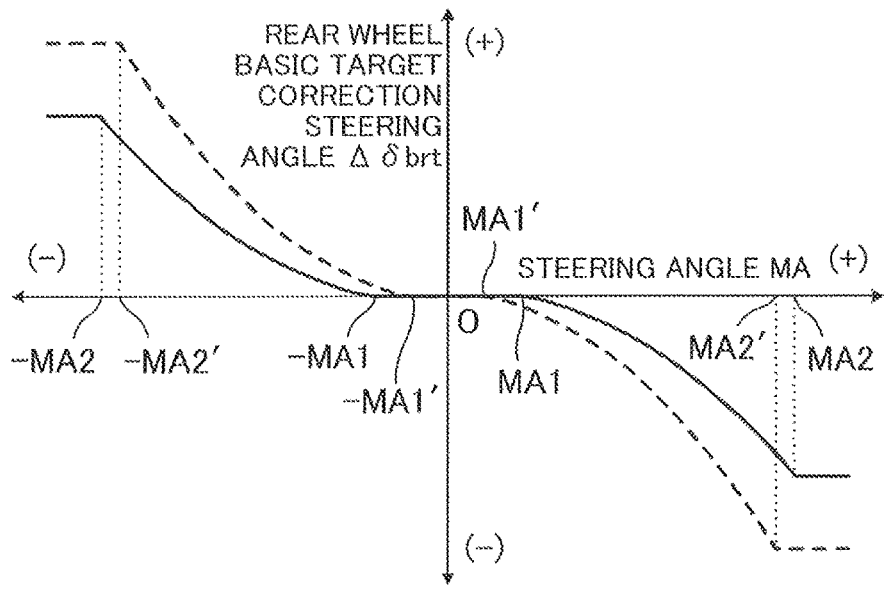
FIG. 10 is a map for calculating a rear wheel basic target correction steering angle $\Delta\delta$brt based on a steering angle MA.

In Step 410 of the rear wheel target correction steering angle Δδrbt calculation routine, the rear wheel basic target correction steering angle Δδbrt is calculated from the map represented by the solid line of FIG. 10 based on the steering angle MA. In this case, the basic target correction steering angle Δδbrt is calculated so as to increase toward the opposite phase side with respect to the front wheels as the magnitude of the steering angle MA increases, and so that an increase rate of the basic target correction steering angle Δδbrt associated with the increase in the magnitude of the steering angle MA increases as the magnitude of the steering angle MA increases. Moreover, this basic target correction steering angle Δδbrt is calculated so as to be 0 in a range in which the magnitude of the steering angle MA is equal to or less than a lower limit reference value MA1 (positive constant), and a constant value in a range in which the magnitude of the steering angle MA is equal to or more than an upper limit reference value MA2 (positive constant more than MA1).

Figure 11:
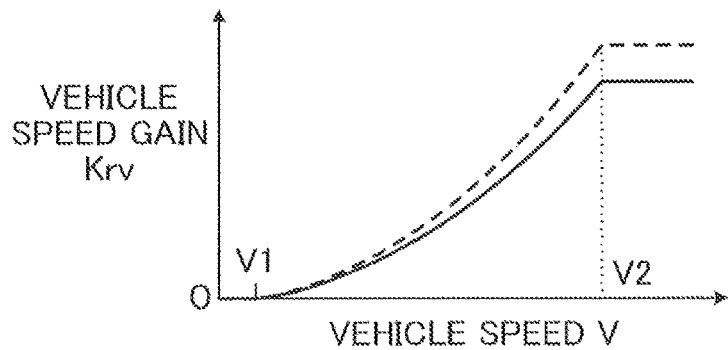
FIG. 11 is a map for calculating a vehicle speed gain Kry based on the vehicle speed V.

In Step 420, a vehicle speed gain Kry for the correction steering for the rear wheels is calculated based on the vehicle speed V from the map represented by the solid line of FIG. 11. In this case, the vehicle speed gain Kry is calculated so as to increase as the vehicle speed V increases, and so that an increase rate of the vehicle gain associated with an increase in the vehicle speed increases as the vehicle speed V increases. Moreover, the vehicle speed gain Kry is calculated so as to be 0 in a range in which the vehicle speed V is equal to or less than a lower limit reference value V1 (positive constant), and a constant value in a range in which the vehicle speed V is equal to or more than an upper limit reference value V2 (positive constant more than V1).

Figure 12:
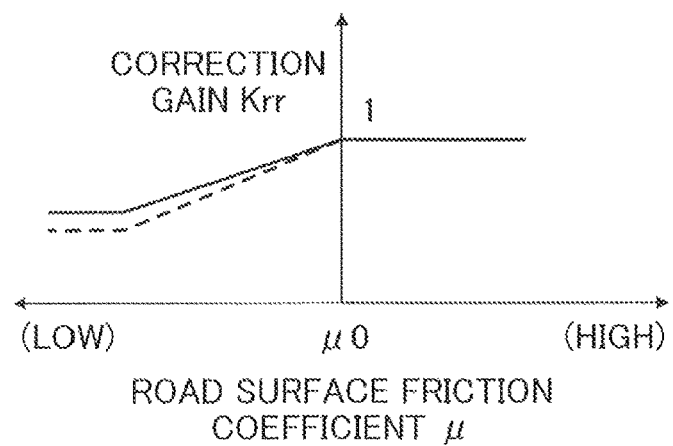
FIG. 12 is a map for calculating a correction gain Krr that is based on a friction coefficient μ of a road surface based on the friction coefficient μ of the road surface.

In Step 430, a correction gain Krr (positive value equal to or less than 1) is calculated based on a friction coefficient μ of the road surface from the map represented by the solid line of FIG. 12. In this case, the correction gain Krr is calculated so as to be 1 in an area where the friction coefficient μ of the road surface is equal to or larger than a standard value μ0 (positive constant), and to decrease as the friction coefficient of the road surface decreases in an area where the friction coefficient μ of the road surface is smaller than the standard value μ0.

It should be noted that how to acquire the friction coefficient μ of the road surface does not constitute a gist of the present invention, and hence the friction coefficient μ of the road surface may be a value detected or estimated by an arbitrary method generally employed for antiskid control, traction control, motion control for a vehicle, and the like.

In Step 440, the rear wheel target correction steering angle Δδbt is calculated as a product of the vehicle speed gain Kry calculated in Step 420, the correction gain Krr calculated in Step 430, and the basic target correction steering angle Δδbrt calculated in Step 410.

As appreciated from the above description, in Step 300, the rear wheel basic target steering angle δrbt for securing the preferred turning responsiveness depending on the vehicle speed V is calculated, and, in Step 400, the rear wheel target correction steering angle Δδbrt for securing an appropriate turning ability of the vehicle is calculated. Then, in Step 500, the rear wheel target steering angle δrt is calculated as a sum of the basic target steering angle δrbt and the target correction steering angle Δδrbt.

In particular, in the medium and high vehicle speed range, the steady-state target steering angle δrst forming the basic target steering angle δrbt along with the derivative target steering angle δrdt is calculated so as to increase in the magnitude in the same phase with respect to the front wheels as the vehicle speed V increases. As a result, an appropriate travel stability of the vehicle in the travel at the medium or high speed is secured. Moreover, the target correction steering angle Δδrbt is calculated as a control amount for correcting the steering angle of the rear wheels toward the opposite phase direction with respect to the front wheel, and a magnitude of the control amount increases as a turn degree of the vehicle increases, that is, the magnitude of the steering angle MA increases, and the vehicle speed V increases.

Thus, in a turn travel state at the medium or high speed in which the turn degree of the vehicle is high, the magnitude of the target correction steering angle δrbt increases, and the control amount for correcting the steering angle of the rear wheels toward the opposite phase direction with respect to the front wheel increases. Thus, compared with when the steering angle of the rear wheels is not corrected toward the opposite phase direction, the slip angle of the vehicle can be increased, and hence in the turn travel state at the medium or high speed in which the turn degree of the vehicle is high, the possibility that an occupant of the vehicle feels that the turning ability of the vehicle deteriorates can be effectively decreased.

It should be noted that in a turn travel state at the medium or high speed in which the turn degree of the vehicle is low, the magnitude of the target correction steering angle Δδrbt is small, and the control amount for correcting the steering angle of the rear wheels toward the opposite phase direction with respect to the front wheels is small, and hence the appropriate travel stability of the vehicle can be secured. Moreover, in this turn travel state, the magnitude of the steering angle MA is not generally a large value, and even when the magnitude of the target correction steering angle Δδrbt is small, the occupant of the vehicle does not feel that the turning ability of the vehicle deteriorates.

Moreover, according to the first embodiment, as shown in FIG. 10, the ratio of the magnitude of the target correction steering angle Δδrbt of the rear wheels to the magnitude of the steering angle MA, that is, a gradient of the line of the map, increases as the magnitude of the steering angle MA increases.

Thus, for example, compared with when the ratio of the magnitude of the target correction steering angle Δδrbt to the magnitude of the steering angle is constant independently of the magnitude of the steering angle, the magnitude of the target correction steering angle $\Delta\delta rbt$ in a state in which the magnitude of the steering angle is large can be increased. Thus, compared with when the above-mentioned ratio is constant, the slip angle of the vehicle in the state in which the magnitude of the steering angle is large can be increased, and hence the possibility that the occupant of the vehicle feels deterioration in the turning ability of the vehicle can be further effectively decreased.

Moreover, according to the first embodiment, as shown in FIG. 11, the vehicle speed gain Kry for the correction steering for the rear wheels is calculated so as to increase as the vehicle speed V increases, and so that the increase rate associated with the increase in the vehicle speed increases as the vehicle speed V increases. Thus, the magnitude of the target correction steering angle $\Delta\delta rbt$ increases as the vehicle speed V increases, and the increase rate of the magnitude of the target correction steering angle $\Delta\delta rbt$ associated with the increase in the vehicle speed increases as the vehicle speed V increases.

Therefore, without the excessive increase in the magnitude of the target correction steering angle $\Delta\delta rbt$ in the state in which the vehicle speed is low, the magnitude of the target correction steering angle $\Delta\delta rbt$ in the state in which the vehicle speed is high can be increased. Thus, without an excessive increase in the slip angle of the vehicle in the state in which the vehicle speed is low, the slip angle of the vehicle in the state in which the vehicle speed is high can be increased, to thereby effectively decrease the possibility that the occupant of the vehicle feels the deterioration in the turning ability of the vehicle.

Figure 18:
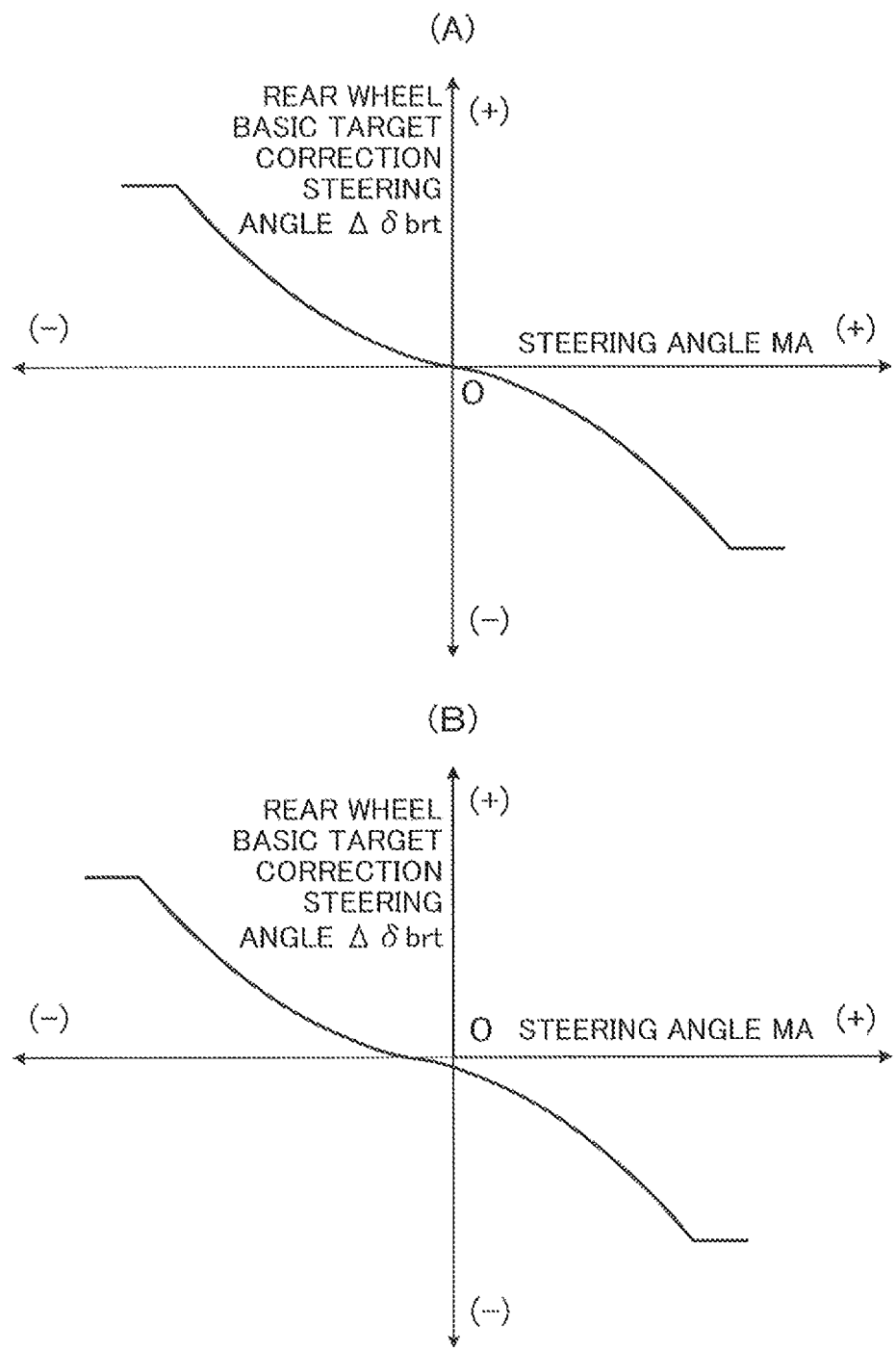
FIG. 18 (A) is a graph for showing a case in which the rear wheel target correction steering angle $\Delta\delta$brt is calculated without setting a so-called dead zone for the steering angle MA, and FIG. 18 (B) is a graph for showing an example of a change in a map in a state in which a neutral displacement occurs.

Moreover, as described above, the so-called neutral displacement may occur in which the steering angle MA of 0 detected by the steering angle sensor 60 does not correspond to the actual straight travel position of the vehicle. In FIG. 18(A), a case is shown in which the rear wheel target correction steering angle $\Delta\delta brt$ is calculated without setting a so-called dead zone for the steering angle MA, and in FIG. 18(B), an example of a change in a map in the state in which the neutral displacement occurs is shown.

In the state shown in FIG. 18(B), even when the detected steering angle MA is 0, the basic target correction steering angle $\Delta\delta brt$ is a negative value, and hence the rear wheels are steered toward the left turn direction of the vehicle, and the straight travel property of the vehicle decreases. Moreover, when the steering is carried out so that the steering angle MA changes toward the right turn direction, the increase rate of the magnitude of the basic target correction steering angle $\Delta\delta brt$ increases, and hence the increase rate of the correction steering amount for the rear wheels toward the opposite phase direction with respect to the front wheels also increases. In contrast, when the steering is carried out so that the steering angle MA changes toward the left turn direction, there is such an area where the basic target correction steering angle $\Delta\delta brt$ is still a negative value even when the steering angle MA takes a negative value. In this area, the rear wheels are not steered in the opposite phase direction with respect to the front wheels, and hence the steering amount in the same phase with respect to the front wheels decreases. Then, when the steering is carried out so that the steering angle MA further changes toward the left turn direction, the rear wheels are steered for the correction toward the opposite phase direction with respect to the front wheels. Thus, when the neutral displacement occurs, the turn characteristic of the vehicle greatly changes depending on the steering direction, and the state in which the driver feels the sense of discomfort as a result of this cannot be avoided.

Figure 19:
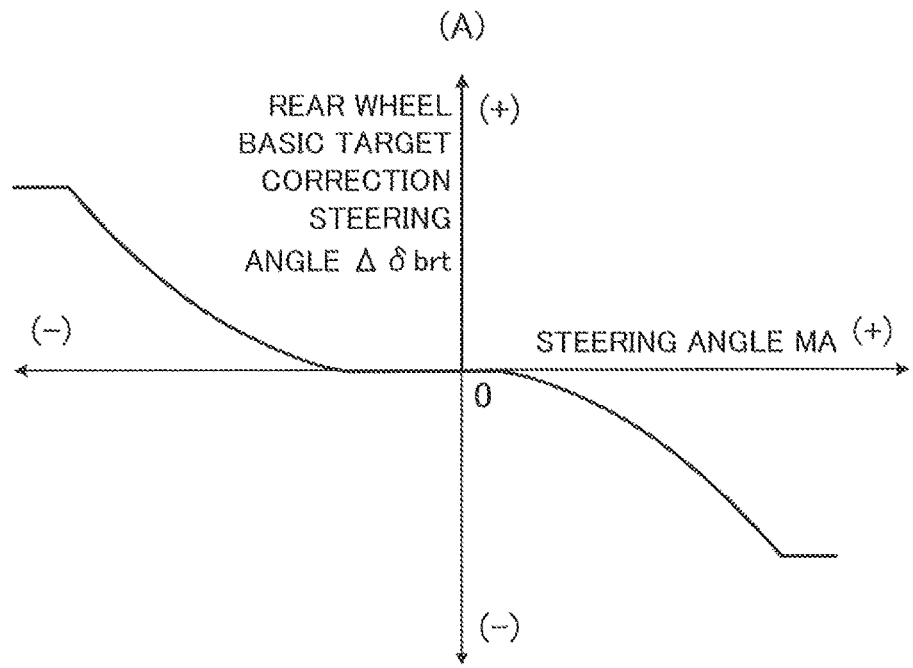
FIG. 19 is a graph for showing a case where steering is carried out from a position at which a steering angle MA is 0 in the state in which a neutral displacement occurs according to the first embodiment.

According to the first embodiment, as shown in FIG. 10, in the area where the magnitude of the steering angle MA is equal to or less than the lower limit reference value MA1, the rear wheel basic target correction steering angle $\Delta\delta brt$ is calculated to be 0, and hence the correction steering for the rear wheels is not carried out. Thus, as shown in FIG. 19, even when the neutral displacement occurs, when the steering is carried out from the position at which the steering angle MA is 0, the rear wheels are steered in the same phase with respect to the front wheels, and the possibility of the occurrence of the case where the steering amount in the same phase decreases and the like can be decreased. Thus, even when the neutral displacement occurs, a degree of the difference in the turn characteristic of the vehicle depending on the steering direction can be decreased, and hence the possibility that the driver feels the sense of discomfort caused by the great difference in the turn characteristic of the vehicle depending on the steering direction can be decreased.

Moreover, as described above, when the friction coefficient $\mu$ of the road surface is small, the vehicle is liable to enter an understeer state or an oversteer state. In particular, in the state in which the vehicle is in the oversteer state, when the magnitude of the basic target correction steering angle $\Delta\delta brt$ increases, and the correction steering is applied to the rear wheels by a large correction steering amount, the steering angle of the rear wheels greatly changes toward the opposite phase direction with respect to the front wheels, and hence the oversteer state of the vehicle degrades.

According to the first embodiment, as shown in FIG. 12, the correction gain Krr is calculated so as to decrease as the friction coefficient of the road surface decreases in an area where the friction coefficient $\mu$ of the road surface is smaller than a standard value $\mu 0$. Thus, when the friction coefficient of the road surface is small, compared with when the friction coefficient of the road surface is large, the magnitude of the basic target correction steering angle $\Delta\delta brt$ can be decreased, thereby decreasing the magnitude of the correction steering amount. Thus, when the friction coefficient of the road surface is small, such a possibility that, as a result of the correction steering, the vehicle enters the oversteer state, or the oversteer state of the vehicle degrades can be decreased. It should be noted that, when the road surface friction coefficient is large, the magnitude of the correction steering amount is not unnecessarily decreased, and hence the possibility that the occupant of the vehicle feels the deterioration of the turning ability of the vehicle can be effectively decreased.

Moreover, as described above, when the magnitude of the steering angle MA increases, and the magnitude of the basic target correction steering angle $\Delta\delta brt$ thus increases, an amount of the change in the steering angle of the rear wheels toward the opposite phase direction with respect to the front wheels increases. As a result, the cornering forces on the rear wheels decrease, and the turn yaw moment acting on the vehicle increases, and the vehicle is thus more liable to enter the oversteer state.

According to the first embodiment, as shown in FIG. 10, the rear wheel basic target correction steering angle $\Delta\delta brt$ is calculated to be a constant value in the area where the magnitude of the steering angle MA is more than the upper limit reference value MA2, and does not increase even when the magnitude of the steering angle MA is more than the upper limit reference value MA2. Thus, even when the magnitude of the steering angle MA is equal to or more than the upper limit reference value MA2, the magnitude of the correction steering amount can be prevented from excessively increasing, and as a result, the possibility that the cornering forces on the rear wheels decrease to cause the vehicle to enter the oversteer state can be effectively decreased.

Further, when the braking is carried out in a state in which the vehicle speed V is relatively high, and the vehicle speed decreases, the steady-state gain Kfs for the front wheels shown in FIG. 6 changes to increase (changes toward the speed increase direction), and the steady-state gain Krs for the rear wheels shown in FIG. 8 changes to decrease (changes toward the opposite phase direction). As a result, particularly when the deceleration of the vehicle is high, the turning responsiveness of the vehicle suddenly increases, and the vehicle is liable to enter the oversteer state excessively.

In contrast, when the braking is carried out in a state in which the vehicle speed V is relatively high, and the vehicle speed decreases, the vehicle speed gain Kry for the correction steering for the rear wheels shown in FIG. 11 decreases. As a result, the rear wheel target correction steering angle Δδrt changes to decrease, and the correction steering amount for the rear wheels toward the opposite phase direction with respect to the front wheels decreases, and hence the turning responsiveness of the vehicle deteriorates. Thus, a possibility that the vehicle enters an excessive oversteer state due to the changes in the steady-state gains Kfs and Krs as a result of the decrease in the correction steering amount for the rear wheels can be decreased.

Figure 20:
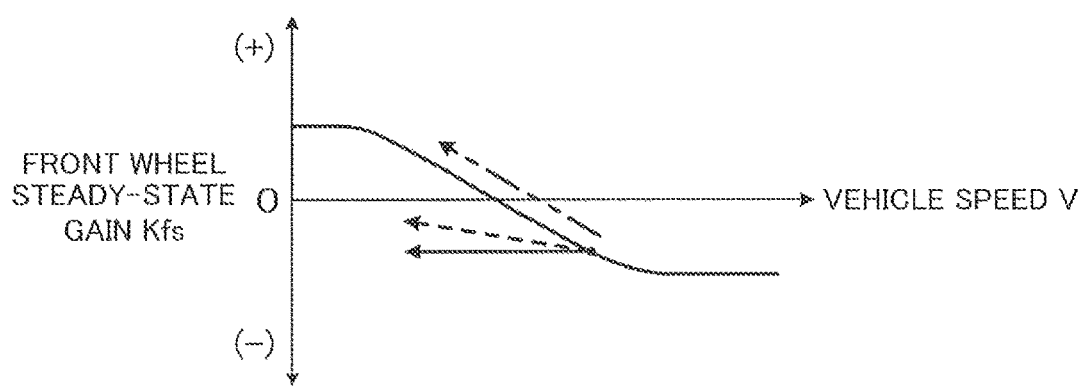
FIG. 20 is an explanatory diagram for showing a case (solid line) in which the steady-state gain Kfs is maintained to be a value at the beginning of the braking and a case (broken line) in which an increase in the steady-state gain Kfs is suppressed in a state in which the braking is carried out and the vehicle speed decreases.
Figure 21:
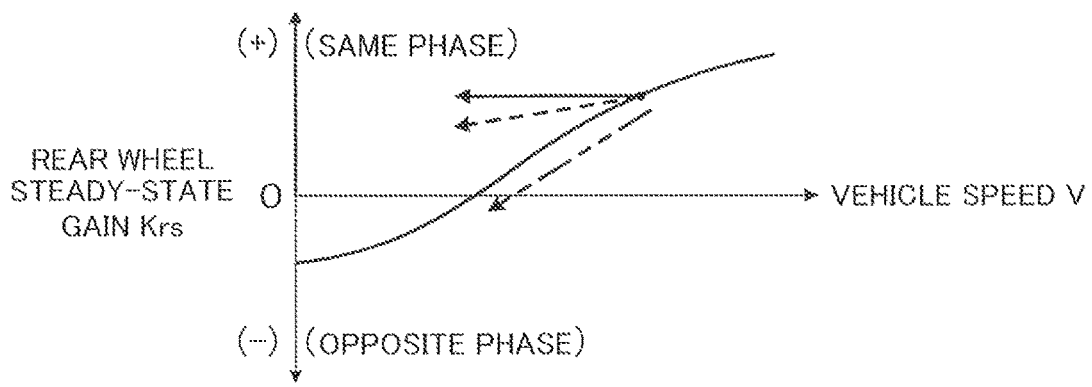
FIG. 21 is an explanatory diagram for showing a case (solid line) in which the steady-state gain Krs is maintained to be the value at the beginning of the braking and a case (broken line) in which a decrease in the steady-state gain Krs is suppressed in the state in which the braking is carried out and the vehicle speed decreases.

It should be noted that when the braking is carried out in the state in which the vehicle speed V is relatively high, and the vehicle speed decreases, as represented by the solid-line arrows of FIG. 20 and FIG. 21, for example, the steady-state gains Kfs and Krs may be maintained to be values at the beginning of the braking until the braking is finished. Alternatively, as represented by the broken-line arrows of FIG. 20 and FIG. 21, for example, until the braking is finished, the steady-state gain Kfs may be controlled to gradually increase from the value when the braking starts, and the steady-state gain Krs may be controlled to gradually decrease from the value when the braking starts. With this control, as represented by the virtual-line arrows of FIG. 20 and FIG. 21, compared with when the above-mentioned control is not carried out, the changes in the steering angles of the front and rear wheels when the vehicle speed decreases can be made more gradual, to thereby decrease the possibility that the vehicle enters the oversteer state.

Second Embodiment

Figure 13:
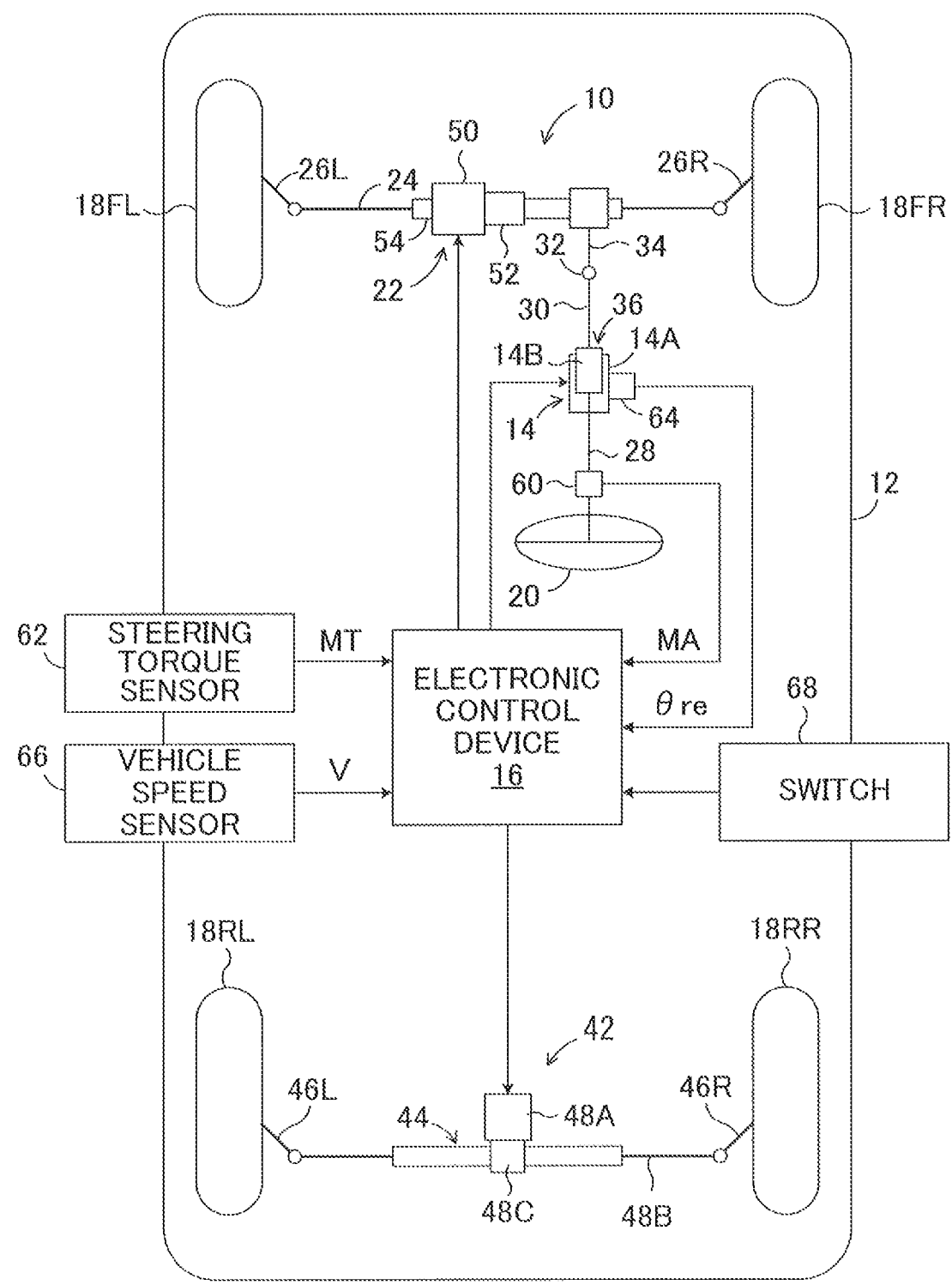
FIG. 13 is a schematic configuration diagram for illustrating a vehicle steering control device according to a second embodiment of the present invention applied to the vehicle on which the steering angle varying device for the front wheels and the rear wheel steering device are installed.

FIG. 13 is a schematic configuration diagram for illustrating a vehicle steering control device according to a second embodiment of the present invention applied to the vehicle on which the steering angle varying device for the front wheels and the rear wheel steering device are installed. It should be noted that, in FIG. 13, the same components as those illustrated in FIG. 1 are denoted by the same reference numerals as those of FIG. 1.

In the second embodiment, the vehicle 12 includes a switch 68, and a travel mode of the vehicle is switched between a normal mode and a sport mode by the occupant of the vehicle operating the switch 68. In the sport mode, the turning responsiveness of the vehicle is controlled so as to be higher than the normal turning responsiveness in the normal mode.

Moreover, in this embodiment, the steering control is carried out in accordance with flowcharts illustrated in FIG. 14 to FIG. 17. It should be noted that, in FIG. 14, the same step as the step illustrated in FIG. 2 is denoted by the same step number as the step number assigned in FIG. 2.

Figure 14:
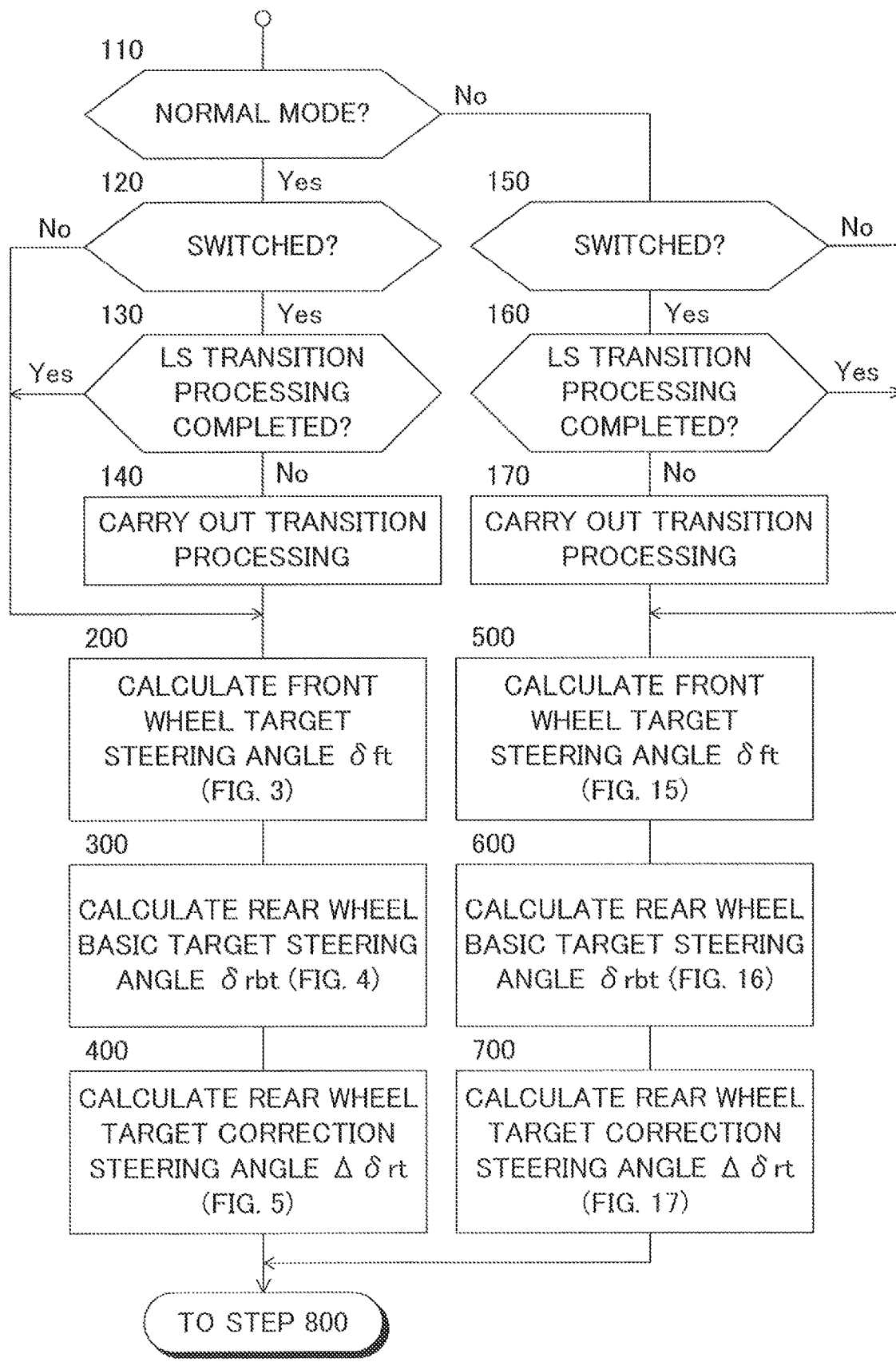
FIG. 14 is a flowchart for illustrating a principal part of a main routine for steering control according to the second embodiment.

<Main Routine for Steering Control> (FIG. 14)

Referring to the flowchart illustrated in FIG. 14, a description is now given of a main routine for the steering control in the second embodiment. It should be noted that the control based on the flowchart illustrated in FIG. 14 is started by switching the ignition switch (not shown) from off to on, and is repeated at predetermined periods.

When Step 50 is completed, the control proceeds to Step 110. Then, in Step 110, whether the travel mode is the normal mode or not is determined. When a negative determination is made, the control proceeds to Step 150. When an affirmative determination is made, the control proceeds to Step 120.

In Step 120, whether the travel mode has been switched from the sport mode to the normal mode or not is determined. When a negative determination is made, the control proceeds to Step 200. When an affirmative determination is made, the control proceeds to Step 130.

In Step 130, whether transition processing carried out in Step 140 described later has been completed or not is determined. Then, when an affirmative determination is made, information on the switching of the travel mode is cleared, and then, the control proceeds to Step 200. When a negative determination is made, the control proceeds to Step 140.

In Step 140, the transition processing from the sport mode to the normal mode of gradually changing the respective control amounts is carried out by gradually changing the maps shown in FIG. 6 to FIG. 11 from the broken lines to the solid lines for each control cycle. In particular, in the map shown in FIG. 10, the change amount of the basic target correction steering angle Δδbrt caused by the transition in the travel mode increases as the magnitude of the steering angle MA increases. Thus, the change in the map from the broken line to the solid line is carried out over a longer period as the magnitude of the steering angle MA increases.

Steps 200 to 400 are carried out as in the first embodiment, and when Step 400 is completed, the control proceeds to Step 800.

In Steps 150 to 170, controls respectively corresponding to Steps 120 to 140 are carried out. In other words, in Step 150, whether the travel mode has been switched from the normal mode to the sport mode or not is determined. When a negative determination is made, the control proceeds to Step 500. When an affirmative determination is made, the control proceeds to Step 160.

It should be noted that, when the maps are in the course of being changed by the transition processing in Step 140, the gains Kfs, Kfd, Krs, and Krd, the rear wheel basic target correction steering angle Mbrt, the vehicle speed gain Krv, and the correction gain Krr are calculated from the maps in the course of the change, respectively.

In Step 160, whether transition processing carried out in Step 170 described later has been completed or not is determined. Then, when an affirmative determination is made, information on the switching of the travel mode is cleared, and then, the control proceeds to Step 500. When a negative determination is made, the control proceeds to Step 170.

In Step 170, the transition processing from the normal mode to the sport mode of gradually changing the respective control amounts is carried out by gradually changing the maps shown in FIG. 6 to FIG. 11 from the broken lines to the solid lines for each control cycle. In particular, in the map shown in FIG. 10, the change in the map from the broken line to the solid line is carried out over a longer period as the magnitude of the steering angle MA increases in the same manner as in Step 140.

Figure 15:
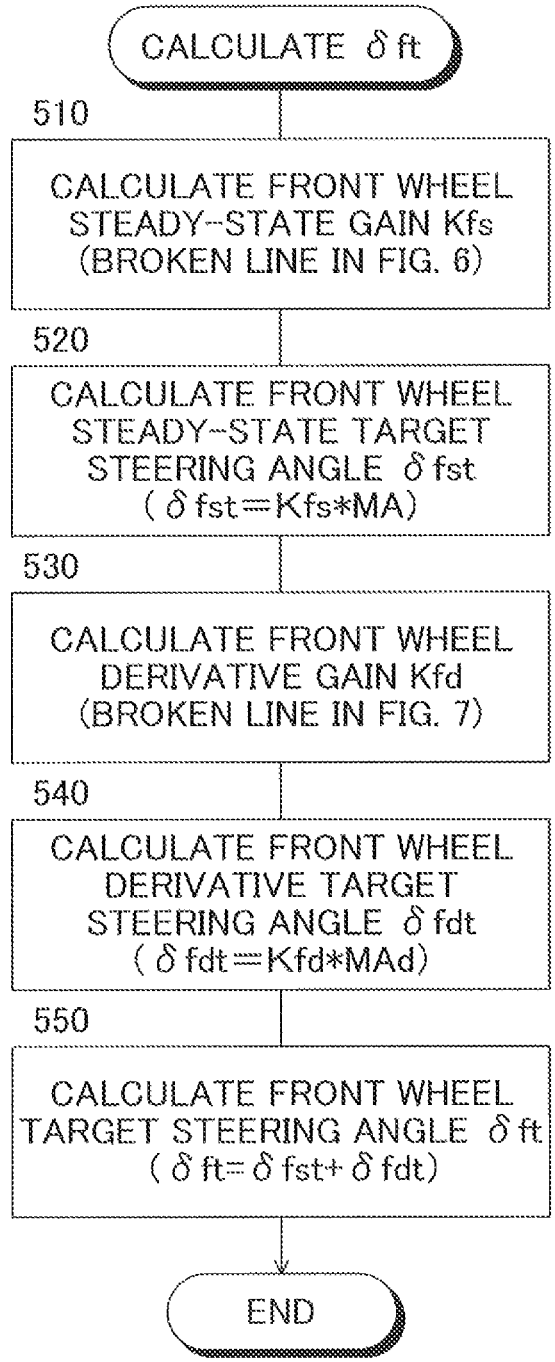
FIG. 15 is a flowchart for illustrating a front wheel target steering angle $\delta$ft calculation routine executed in Step 500 of FIG. 14.
Figure 16:
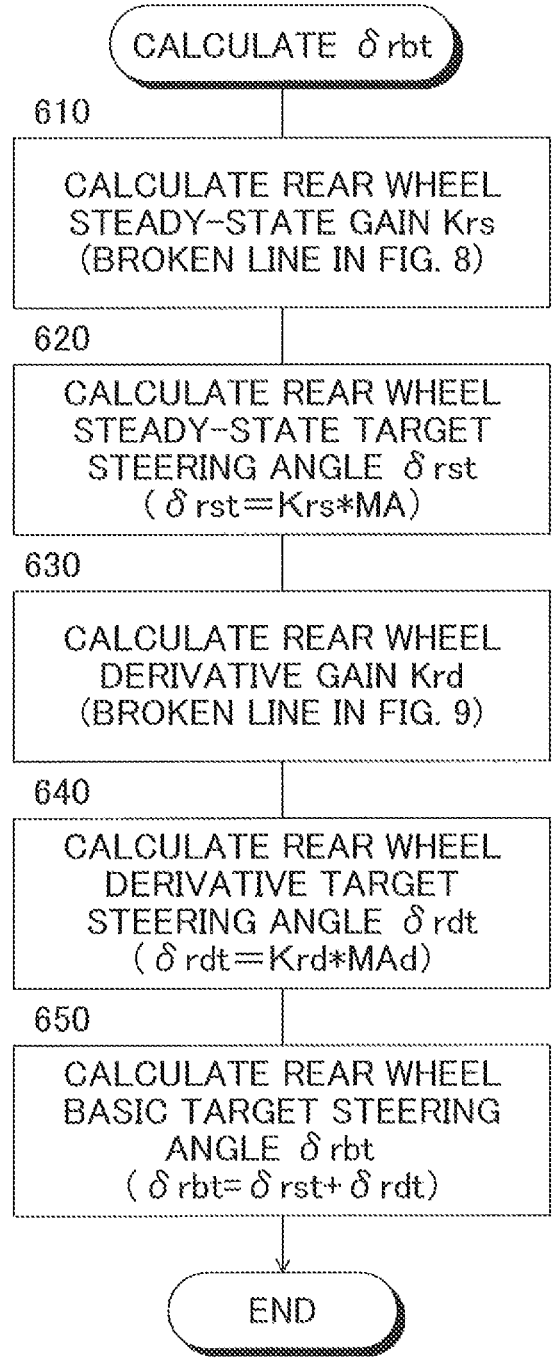
FIG. 16 is a flowchart for illustrating a rear wheel basic target steering angle $\delta$rbt calculation routine executed in Step 600 of FIG. 14.
Figure 17:
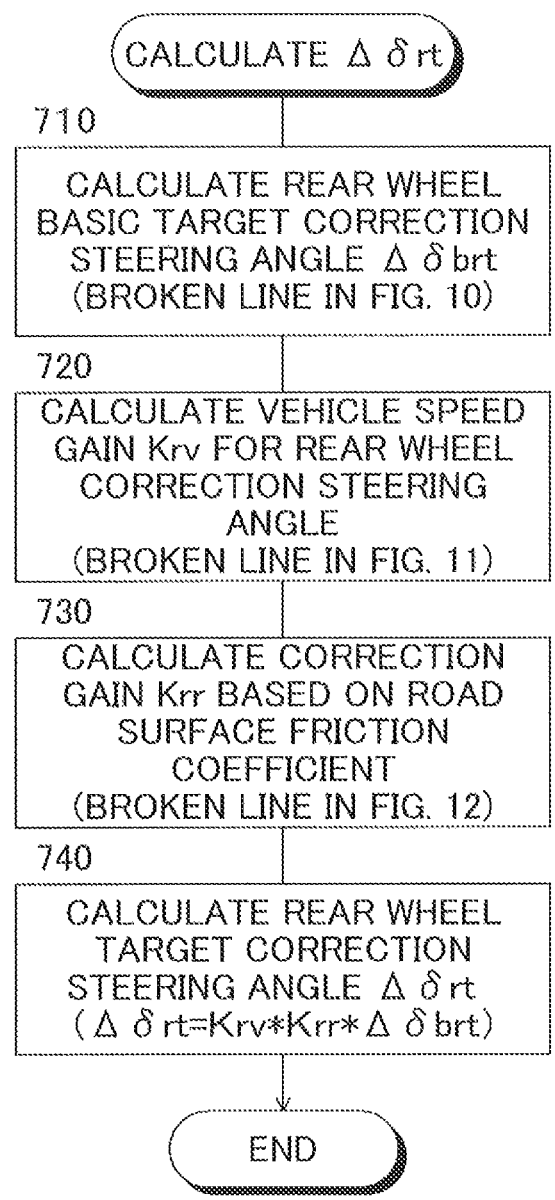
FIG. 17 is a flowchart for illustrating a rear wheel target correction steering angle $\Delta\delta$rbt calculation routine executed in Step 700 of FIG. 14.

Steps 500 to 700 are carried out in accordance with flowcharts illustrated in FIG. 15 to FIG. 17 corresponding to the flowcharts illustrated in FIG. 3 to FIG. 5, and when Step 700 is completed, the control proceeds to Step 800.

Front Wheel Target Steering Angle δft Calculation Routine (FIG. 15)

In Step 510, the steady-state gain Kfs for the front wheels is calculated based on the vehicle speed V from the map represented by the broken line of FIG. 6. In Step 530, the derivative gain Kfd for the front wheels is calculated based on the vehicle speed V from the map represented by the broken line of FIG. 7. It should be noted that when the maps are in the course of being changed by the transition processing in Step 170, the steady-state gain Kfs and the derivative gain Kfd are calculated from the maps in the course of the change.

The other steps, namely, Steps 520, 540, and 550, are respectively carried out in the same manner as in Steps 120, 140, and 150.

<Rear Wheel Basic Target Steering Angle δrbt Calculation Routine> (FIG. 16)

In Step 610, the steady-state gain Krs for the rear wheels is calculated based on the vehicle speed V from the map represented by the broken line of FIG. 8. In Step 630, the derivative gain Krd for the rear wheels is calculated based on the vehicle speed V from the map represented by the broken line of FIG. 9.

It should be noted that when the maps are in the course of being changed by the transition processing in Step 170, the steady-state gain Krs and the derivative gain Krd are calculated from the maps in the course of the change. The other steps, namely, Steps 620, 640, and 650, are respectively carried out in the same manner as in Steps 320, 340, and 350.

<Rear Wheel Target Correction Steering Angle Δδrbt Calculation Routine> (FIG. 17)

In Step 710, the rear wheel basic target correction steering angle Δδrt is calculated based on the steering angle MA from the map represented by the broken line of FIG. 10. In Step 720, the vehicle speed gain Kry for the correction steering for the rear wheels is calculated based on the vehicle speed V from the map represented by the broken line of FIG. 11.

As shown in FIG. 10, a lower limit value MA1' and an upper limit value MA2' of the steering angle MA for calculating the rear wheel basic target correction steering angle Δδbrt from the map represented by the broken line are respectively smaller than the lower limit value MA1 and the upper limit value MA2 of the map represented by the solid line. Moreover, the magnitude of the basic target correction steering angle Δδbrt of the map represented by the broken line is larger than the magnitude of the basic target correction steering angle Δδbrt of the map represented by the solid line, and a difference therebetween increases as the magnitude of the steering angle MA increases.

In Step 730, the correction gain Krr is calculated based on the friction coefficient μ of the road surface from the map represented by the broken line of FIG. 12. In this case, the correction gain Krr is calculated so as to be 1 in the area where the friction coefficient μ of the road surface is equal to or larger than the standard value μ0, and so as to be smaller than the value in the case of the solid line and to decrease as the friction coefficient of the road surface decreases in the area where the friction coefficient μ of the road surface is smaller than the standard value μ0.

It should be noted that when the maps are in the course of being changed by the transition processing in Step 170, the basic target correction steering angle Δδbrt, the vehicle speed gain Krv, and the correction gain Krr are calculated from the maps in the course of the change. Moreover, the other step, namely, Step 740 is carried out in the same manner as in Step 440.

In this way, according to the second embodiment, when the travel mode of the vehicle is set to the normal mode by the operation on the switch 68, in Step 110, the affirmative determination is made, and in Steps 200 to 400, the steering control in the normal mode is carried out. In contrast, when the travel mode of the vehicle is set to the sport mode, in Step 110, the negative determination is made, and in Steps 500 to 700, the steering control in the sport mode is carried out.

Thus, irrespective of whether the travel mode is in the normal mode or the sport mode, in the turn travel state at the medium or high speed in which the turn degree of the vehicle is high, the steering angle for the rear wheels can be corrected toward the opposite phase direction with respect to the front wheels. Thus, compared with when the steering angle of the rear wheels is not corrected toward the opposite phase direction, the slip angle of the vehicle can be increased, and as a result, the possibility that the occupant of the vehicle feels that the turning ability of the vehicle deteriorates can be effectively decreased.

As described above, when the magnitude of the steering angle exceeds the constant lower limit reference independently of the turning responsiveness of the vehicle and the correction steering is carried out, the turn lateral acceleration of the vehicle when the correction steering starts varies depending on the degree of the turning responsiveness of the vehicle. Therefore, depending on whether the travel mode is in the normal mode or in the sport mode, the variation in the turn lateral acceleration of the vehicle when the correction steering starts cannot be avoided.

According to the second embodiment, the rear wheel basic target correction steering angle Δδbrt is calculated from the map represented by the solid line when the travel mode is the normal mode, and is calculated from the map represented by the broken line when the travel mode is the sport mode. Then, the lower limit value MA1' of the steering angle MA of the map represented by the broken line is smaller than the lower limit value MA1 of the map represented by the solid line.

Thus, the degree of the variation depending on the travel mode in the turn lateral acceleration of the vehicle when the correction steering starts can be decreased. Thus, the great variation depending on the travel mode in the turn lateral acceleration of the vehicle when the correction steering starts and the possibility that the occupant of the vehicle feels the sense of discomfort caused by this can be decreased.

Moreover, as described above, the magnitude of the basic target correction steering angle Δδbrt of the map represented by the broken line is larger than the magnitude of the basic target correction steering angle Δδbrt of the map represented by the solid line, and the difference therebetween increases as the magnitude of the steering angle MA increases. Thus, in order to prevent a rapid change in the magnitude of the correction steering amount when the travel mode transitions between the two travel modes, when the magnitude of the steering angle is large, the transition is preferably slowly carried out compared with when the magnitude of the steering angle is small.

According to the second embodiment, the change in the map from the broken line to the solid line in Step 140 of FIG. 10 and the change in the map from the solid line to the broken line in Step 170 of FIG. 10 are carried out over a longer period as the magnitude of the steering angle MA increases. Thus, even when the magnitude of the steering angle is large, a change in the magnitude of the correction steering amount when the travel mode transitions can be made slow, and as a result, the rapid change in the rear wheel target correction steering angle Δδrt and an undesirable change in a behavior of the vehicle caused by the rapid change can be prevented.

Moreover, as described above, when the magnitude of the steering angle increases, and the magnitude of the correction steering amount thus increases, an amount of the change in the steering angle of the rear wheels toward the opposite phase direction with respect to the front wheels increases, and hence the cornering forces on the rear wheels decrease. In order to effectively decrease the possibility that the vehicle enters the oversteer state due to the decrease in the cornering forces on the rear wheels, when the turning responsiveness of the vehicle is high, the cornering forces on the rear wheels are preferably early prevented from decreasing compared with when the turning responsiveness of the vehicle is low.

According to the second embodiment, the upper limit value MA2' shown in FIG. 10 is smaller than the upper limit value MA2. Thus, when the travel mode is the sport mode, the prevention of the decrease in the cornering forces on the rear wheels can be started earlier than when the travel mode is the normal mode. Thus, compared with when the upper limit value MA2' is equal to or more than the upper limit value MA2, the possibility that the vehicle enters the oversteer state due to the decrease in the cornering forces on the rear wheels can be effectively decreased.

Further, as shown in FIG. 12, the correction gain Krr is calculated so as to be smaller than the value in the case of the solid line and to decrease as the friction coefficient of the road surface decreases in the area where the friction coefficient μ of the road surface is smaller than the standard value μ0. Thus, a decrease correction amount for the rear wheel target correction steering angle Δδrt can be increased as the friction coefficient of the road surface decreases, which can also effectively decrease the possibility that the vehicle enters the oversteer state due to the decrease in the cornering forces on the rear wheels.

A detailed description has been given of the specific embodiments of the present invention, but it is apparent to those skilled in the art that the present invention is not limited to the embodiments, and various embodiments are possible within a scope of the present invention.

For example, in the first and second embodiments, the lower limit reference values MA1 and MA1' and the upper limit reference values MA2 and MA2' of FIG. 10 are positive constants, but may be variably set depending on the vehicle speed so as to decrease when the vehicle speed V is high compared with when the vehicle speed is low.

In particular, when the lower limit reference values are variably set as described above, and the vehicle speed is high, compared with when the vehicle speed is low, the correction steering can be carried out even under the condition that the magnitude of the steering angle is small. As a result, the possibility that the occupant of the vehicle feels the decrease in the turning ability of the vehicle can be effectively decreased. Moreover, if the upper limit reference values are variably set as described above, when the vehicle speed is high and the possibility that the travel stability of the vehicle decreases due to the decrease in the cornering forces on the rear wheels is high, the magnitude of the correction steering amount can be prevented from increasing at a stage where the magnitude of the steering angle is small.

Moreover, in the first and second embodiment, the rear wheel target correction steering angle Δδrbt is calculated as the product of the vehicle speed gain Krv, the correction gain Krr, and the basic target correction steering angle Δδbrt, and the basic target correction steering angle Δδbrt is calculated from the map shown in FIG. 10.

Figure 22:
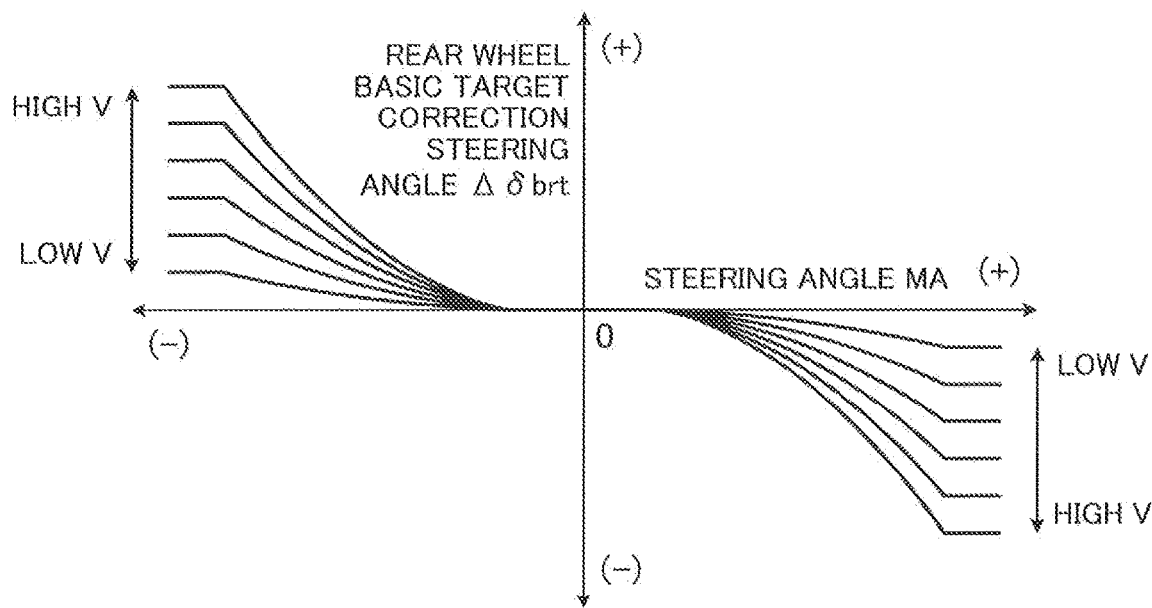
FIG. 22 is a map for calculating the basic target correction steering angle $\Delta\delta$brt based on the steering angle MA and the vehicle speed V in a state in which a travel mode of the vehicle is a normal mode.
Figure 23:
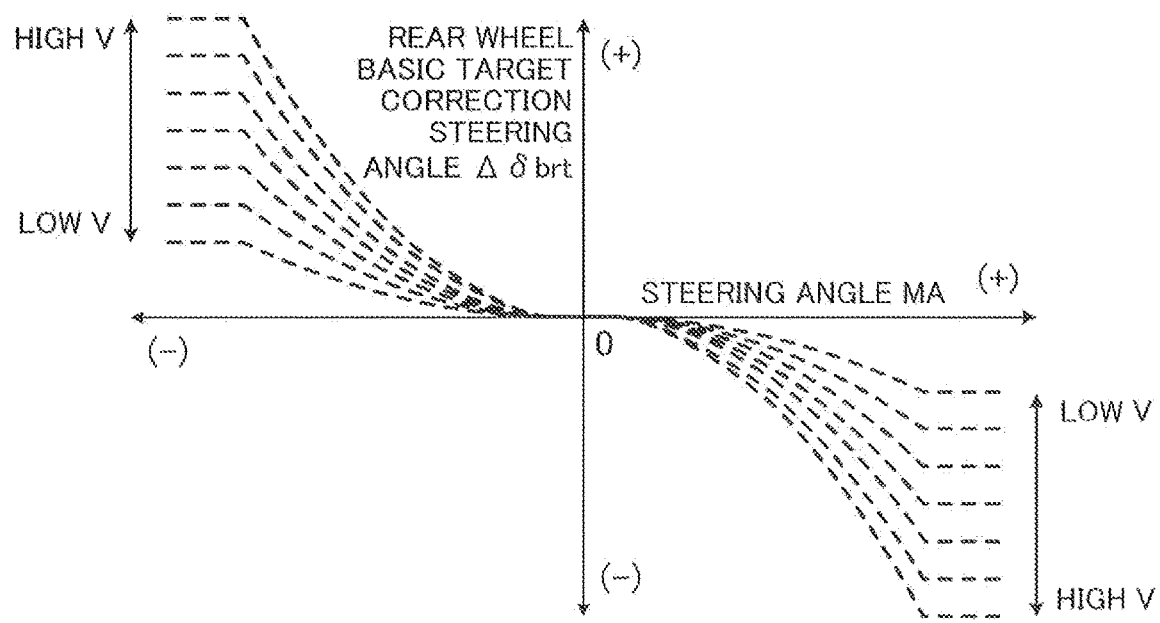
FIG. 23 is a map for calculating the basic target correction steering angle $\Delta\delta$brt based on the steering angle MA and the vehicle speed V in a state in which the travel mode of the vehicle is a sport mode.

However, when the travel mode of the vehicle is the normal mode, the basic target correction steering angle Δδbrt may be calculated based on the steering angle MA and the vehicle speed V from the map shown in FIG. 22. Similarly, when the travel mode of the vehicle is the sport mode, the basic target correction steering angle Δδbrt may be calculated based on the steering angle MA and the vehicle speed V from the map shown in FIG. 23. Then, in those cases, the rear wheel target correction steering angle Δδrbt may be calculated as a product of the correction gain Krr and the basic target correction steering angle Δδbrt.

Figure 24:
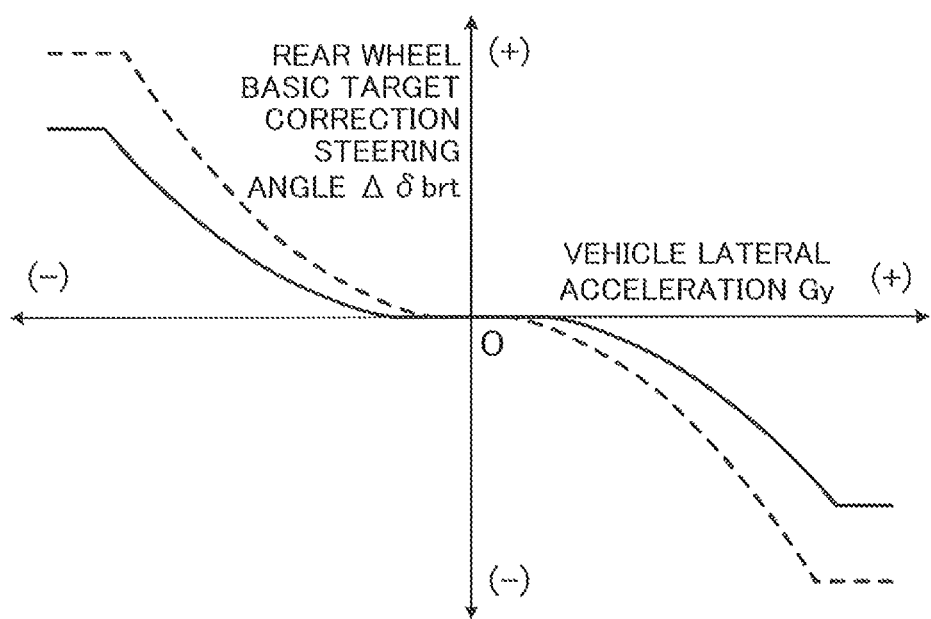
FIG. 24 is a map for calculating the basic target correction steering angle Δδbrt based on a lateral acceleration Gy of the vehicle.

Moreover, when the travel mode of the vehicle is the normal mode, the basic target correction steering angle Δδbrt may be calculated based on the lateral acceleration Gy of the vehicle from the map represented by the solid line of FIG. 24. Similarly, when the travel mode of the vehicle is the sport mode, the basic target correction steering angle Δδbrt may be calculated based on the lateral acceleration Gy of the vehicle from the map represented by the broken line of FIG. 24. Then, in those cases, the rear wheel target correction steering angle Δδrbt may be calculated as the product of the correction gain Krr and the basic target correction steering angle Δδbrt.

It should be noted that, in those cases, the lateral acceleration Gy of the vehicle may be an actual lateral acceleration Gy detected by a lateral acceleration sensor, or a lateral acceleration Gyh estimated, for example, based on the steering angle MA and the vehicle speed V. In particular, if the lateral acceleration Gy of the vehicle is the actual lateral acceleration Gy, the value detected by the lateral acceleration sensor preferably undergoes low-pass filtering so as to remove a variation caused by disturbance.

In the first and second embodiments, the vehicle includes the steering angle varying device 14 functioning as the steering gear ratio varying device, but the present invention may be applied to the vehicle without the steering angle varying device. Moreover, the present invention may be applied to the vehicle on which the front wheels are steered by a steering device of a steer-by-wire type.

Moreover, in the first and second embodiments, the correction gain Krr based on the friction coefficient μ of the road surface is calculated based on the friction coefficient μ of the road surface from the map shown in FIG. 12. Then, the rear wheel target correction steering angle Δδrbt is calculated as the product of the vehicle speed gain Krv, the correction gain Krr, and the basic target correction steering angle Δδbrt. However, the correction gain Krr based on the friction coefficient μ of the road surface may be omitted.

It should be noted that, in this case, when the oversteer state of the vehicle or the possibility thereof is determined, and when the vehicle is or may be in the oversteer state, the rear wheel target correction steering angle Δδrbt is preferably decreased.

The invention claimed is:

1. A vehicle steering control device of a vehicle, the vehicle steering control device comprising:

a front wheel steering device configured to steer a front wheel in response to a steering operation by a driver;

a rear wheel steering device configured to steer a rear wheel independently of the steering operation by the driver;

a switch that is operable by an occupant of the vehicle to switch a travel mode of the vehicle between a travel mode of a normal turning responsiveness and a travel mode of a high turning responsiveness that is higher than the normal turning responsiveness; and an electronic control unit (ECU) that:

when the travel mode of the vehicle is the travel mode of the high turning responsiveness, sets a lower limit reference value to be decreased compared with when the travel mode of the vehicle is the travel mode of the normal turning responsiveness;

when correction steering is steering the rear wheel toward an opposite phase direction with respect to the front wheel, and when a magnitude of a steering angle representing a steering operation amount by the driver is large in a state in which the rear wheel is steered in the same phase with respect to the front wheel by the rear wheel steering device, controls the rear wheel steering device so that a magnitude of a correction steering amount is large compared with when the magnitude of the steering angle is small; and when the magnitude of the steering angle is equal to or less than the lower limit reference value, the correction steering is inhibited from being carried out.

2. The vehicle steering control device according to claim 1, wherein, when the magnitude of the steering angle is large, a ratio of the magnitude of the correction steering amount to the magnitude of the steering angle is large compared with when the magnitude of the steering angle is small.

3. The vehicle steering control device according to claim 1, wherein the magnitude of the correction steering amount is large when a vehicle speed is high compared with when the vehicle speed is low.

4. The vehicle steering control device according to claim 1, wherein the magnitude of the correction steering amount is small when a friction coefficient of a road surface is small compared with when the friction coefficient of the road surface is large.

5. The vehicle steering control device according to claim 1, wherein the lower limit reference value is small when a vehicle speed is high compared with when the vehicle speed is low.

6. The vehicle steering control device according to claim 1, wherein when the magnitude of the steering angle is equal to or more than an upper limit reference value, the magnitude of the correction steering amount is inhibited from being increased even when the magnitude of the steering angle increases.

7. The vehicle steering control device according to claim 6, wherein the upper limit reference value is small when a vehicle speed is high compared with when the vehicle speed is low.

8. The vehicle steering control device according to claim 6, wherein the upper limit reference value is small when the travel mode is the travel mode of the high turning responsiveness compared with when the travel mode is the travel mode of the normal turning responsiveness.

9. The vehicle steering control device according to claim 1, wherein a ratio of the magnitude of the correction steering amount to the magnitude of the steering angle is large when the travel mode is the travel mode of the high turning responsiveness compared with when the travel mode is the travel mode of the normal turning responsiveness, and a period of a transition of the travel mode between the two travel modes is long when the magnitude of the steering angle is large compared with when the magnitude of the steering angle is small.

* * * * *